(12) United States Patent
Wunder

(10) Patent No.: US 6,735,494 B2
(45) Date of Patent: May 11, 2004

(54) SYSTEM FOR AUTOMATICALLY CERTIFYING THE ACCURACY OF A MANUFACTURING MACHINE

(75) Inventor: Michael D. Wunder, St. Charles, MO (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/407,658

(22) Filed: Apr. 4, 2003

(65) Prior Publication Data

US 2003/0195649 A1 Oct. 16, 2003

Related U.S. Application Data

(62) Division of application No. 09/564,295, filed on May 3, 2000, now Pat. No. 6,571,148.

(51) Int. Cl.⁷ .......................... G06F 19/00; G05B 19/04; G01D 18/00
(52) U.S. Cl. .......................... 700/175; 700/254; 73/1.03; 73/865.9; 702/85
(58) Field of Search .............................. 700/56–66, 71, 700/112–114, 159, 160, 169, 170, 186–195, 253, 254, 262, 263, 108–110, 174–177; 73/1.01, 1.03, 1.86, 1.89, 105, 865.9; 702/85, 105; 33/502–505; 409/73–76, 78–80

(56) References Cited

U.S. PATENT DOCUMENTS

| | | | |
|---|---|---|---|
| 4,372,721 A | 2/1983 | Harjar et al. ................ 700/254 |
| 4,581,566 A | 4/1986 | Ekstrom et al. ............. 700/254 |
| 4,642,781 A | 2/1987 | Szonyi ........................ 700/254 |
| 4,815,006 A | 3/1989 | Andersson et al. ......... 700/254 |
| 4,816,729 A | 3/1989 | Carlson .................. 318/568.24 |
| 5,150,529 A | * | 9/1992 | Collingwood ................ 33/503 |
| 5,257,460 A | * | 11/1993 | McMurtry .................... 33/502 |
| 5,311,784 A | 5/1994 | Girard et al. ............... 73/865.8 |
| 5,387,061 A | * | 2/1995 | Barkman et al. ............. 409/80 |
| 5,392,384 A | 2/1995 | Tounai et al. ................ 700/254 |
| 5,481,668 A | 1/1996 | Marcus ........................ 345/853 |
| 5,539,304 A | 7/1996 | Payne et al. ................... 324/74 |
| 5,808,432 A | 9/1998 | Inoue et al. ................. 318/561 |
| 5,834,623 A | 11/1998 | Ignagni ....................... 702/105 |
| 5,955,654 A | 9/1999 | Stover et al. ................ 73/1.89 |
| 5,996,239 A | * | 12/1999 | Ohnheiser .................... 33/503 |
| 6,138,495 A | 10/2000 | Paltieli et al. .............. 73/1.86 |
| 6,311,540 B1 | 11/2001 | Paltieli et al. .............. 73/1.82 |
| 6,317,699 B1 | 11/2001 | Watanabe et al. ............. 702/94 |
| 6,321,137 B1 | 11/2001 | De Smet ..................... 700/245 |
| 6,370,789 B1 | * | 4/2002 | Madlener et al. ............. 33/561 |
| 6,571,148 B1 | * | 5/2003 | Wunder ....................... 700/175 |

* cited by examiner

Primary Examiner—Maria N. Von Buhr
(74) Attorney, Agent, or Firm—Alston & Bird LLP

(57) ABSTRACT

A combined manufacturing machine and certifying system are operable for performing a first operation of the machine, obtaining first data by quantifying the first operation of the machine using first measurement equipment of known accuracy, performing a second operation of the machine, obtaining second data by quantifying the second operation of the machine using second measurement equipment, determining the accuracy of the second measurement equipment by quantifying the difference between the first and second data, machining a first workpiece with the machine after determining the accuracy of the second accuracy measurement equipment, performing a third operation of the machine after machining the first workpiece, and obtaining third data by quantifying the third operation of the machine using the second accuracy measurement equipment.

9 Claims, 15 Drawing Sheets

144

| Axis Data Set | | | | |
|---|---|---|---|---|
| Axis | Parameter | First Point | ...Point | Nth Point |
| X Axis (for upper clamp) | position coordinates | data | data | data |
| | velocity | data | data | data |
| Y Axis (for upper clamp) | position coordinates | data | data | data |
| | velocity | data | data | data |
| Z Axis (for upper clamp) | position coordinates | data | data | data |
| | velocity | data | data | data |
| X Axis (for lower clamp) | position coordinates | data | data | data |
| | velocity | data | data | data |
| Y Axis (for lower clamp) | position coordinates | data | data | data |
| | velocity | data | data | data |
| Z Axis (for lower clamp) | position coordinates | data | data | data |
| | velocity | data | data | data |

| Ring Data Set | | | | |
|---|---|---|---|---|
| Ring Target | Parameter | First Point | ...Point | Nth Point |
| Upper (for upper clamp | position coordinates for clockwise motion | data | data | data |
| Upper (for upper clamp | position coordinates for counterclockwise motion | data | data | data |
| Lower (for lower clamp | position coordinates for clockwise motion | data | data | data |
| Lower (for lower clamp | position coordinates for counterclockwise motion | data | data | data |

FIGURE 11

| Cube Target | Parameter | X-Y surface | Cube Data Set upper X-Z surface | lower X-Z surface | right Y-Z surface | left Y-Z surface |
|---|---|---|---|---|---|---|
| First (for upper) | position coordinates | data | data | data | data | data |

SYSTEM FOR AUTOMATICALLY CERTIFYING THE ACCURACY OF A MANUFACTURING MACHINE

CROSS-REFERENCE TO RELATED APPLICATION

This application is a divisional of application Ser. No. 09/564,295, which was filed May 3, 2000, now issued as U.S. Pat. No. 6,571,148, and is incorporated herein by reference.

FIELD OF THE INVENTION

The present invention pertains to numerically controlled/computer-operated manufacturing machines that manipulate one or more tools to perform manufacturing tasks and, more particularly, to the accuracy of such manufacturing machines.

BACKGROUND OF THE INVENTION

Numerically controlled/computer-operated manufacturing machines that manipulate tools to perform manufacturing tasks, such as machining parts, are widely used. It is important for the accuracy of mechanical movements of manufacturing machines to be maintained in order for the machines to accurately manufacture parts. Accordingly, it is common to periodically remove manufacturing machines from service in order to fully check their accuracy and perform any adjustments that are necessary. The accuracy of manufacturing machines is typically checked with traditional metrological devices, which include laser transmitters and receivers, ball-bar testing equipment, and the like. It is common for a manufacturing machine to be out of service for several days in order for its accuracy to be fully checked.

Removing manufacturing machines from service in order to check their accuracy detrimentally decreases the number of parts that the manufacturing machines fabricate. Accordingly, it is common for manufacturing machines to be operated for as long as possible before being removed from service for accuracy checks. This can disadvantageously result in the manufacture of marginally acceptable or unacceptable parts.

It is common for parts manufactured by a manufacturing machine to be inspected after they are removed from the manufacturing machine, and this inspection is often referred to as a post operation inspection. Post operation inspections can be disadvantageously time consuming and/or require expensive equipment. For example, post operation inspections can be facilitated through the use of hand-operated calipers, micrometers, coordinate measuring machines laser devices and other conventional inspection tools.

It is common for a problem with a manufacturing machine to be initially identified via post operation inspections due to the disincentive for frequently removing a manufacturing machine from service for a full accuracy check. However, post operation inspections often do not identify specific corrective actions that need to be taken for a manufacturing machine that has produced an unacceptable part. The act of measuring a part is a way of identifying if there is a discrepancy, but the data associated with the measurement of the part often is not very useful at identifying why the discrepancy occurred. In addition, clamping, lifting, and transporting actions that are typically associated with moving manufactured parts from a manufacturing machine to an inspection station or machine, as well as differences in temperature between the manufacturing location and the inspection location, can disadvantageously increase the number of variables that can have an impact on the post operation inspection process.

In summary, it can be disadvantageous to remove a manufacturing machine from service for the extended period of time that is required to perform a full accuracy check for the manufacturing machine. It can also be disadvantageous to leave a manufacturing machine in service for too long and have it fabricate marginally acceptable or unacceptable parts. Further, post operation inspection procedures can be disadvantageously time consuming and/or expensive, they may not provide much useful information about which aspect of the manufacturing machine is not operating accurately, and they may introduce complicating variables into any associated analysis of the manufacturing machine.

SUMMARY OF THE INVENTION

The present invention solves the above and other problems by providing a certifying system that is capable of being associated with and operated in conjunction with a manufacturing machine. The certifying system can decrease the number of full accuracy checks that are performed for the manufacturing machine, can identify when the manufacturing machine should be subjected to a full accuracy check, and can provide current information about the accuracy of the manufacturing machine between full accuracy checks, so that the manufacturing machine may be utilized to accurately inspect parts manufactured thereby in a manner that can reduce the dependence upon post operation inspection.

More specifically, in accordance with one aspect of the present invention, the combined manufacturing machine and certifying system performs operations that carry out a method. The method includes performing a first operation of the manufacturing machine, obtaining first data by quantifying the first operation of the manufacturing machine using first measurement equipment of known accuracy, performing a second operation of the manufacturing machine, obtaining second data by quantifying the second operation of the manufacturing machine using second measurement equipment (e.g., machine-dedicated measurement equipment), determining the accuracy of the second measurement equipment by quantifying the difference between the first and second data, machining a workpiece with the manufacturing machine after determining the accuracy of the second accuracy measurement equipment, performing a third operation of the machine after machining the workpiece, and obtaining third data by quantifying the third operation of the manufacturing machine using the second measurement equipment.

In accordance with another aspect of the present invention, the second and third data are compared in an effort to identify any degradation of the manufacturing equipment.

In accordance with another aspect, the third operation includes operating the manufacturing machine to inspect the workpiece after the workpiece has been machined.

In accordance with another aspect of the present invention, the manufacturing machine and certifying system are combined to provide an improved manufacturing machine that is capable of sequentially machining workpieces by moving tools relative to the workpieces. The improved manufacturing machine includes a holder that is capable of holding a workpiece, and at least one manipulator having a clamp that is operable for gripping the tools. The manipulator is operative for moving the clamp so that a tool gripped by the clamp can be used upon the workpiece. The improved manufacturing machine further includes a stimulus device mounted at a fixed position for remaining fixed relative to the holder while the workpieces are machined in the sequential fashion. The stimulus devices can be optical or mechanical. The improved manufacturing machine further includes a sensor assembly that is capable of being gripped by and carried by the clamp while the clamp is moved relative to the holder. The sensor assembly is operative for generating a signal in response to being proximate the stimulus devices or stimulus provided therefrom. The improved manufacturing machine further includes a computer system that includes a receiver, which is operative for receiving signals generated by the sensor assembly, and a memory containing a database. The computer system is operative for controlling the operation of the manipulator. Initially, the clamp holds the sensor assembly and the manipulator moves the sensor assembly to proximate the stimulus device or a stimulus provided therefrom so that the sensor assembly generates a signal and the signal is received by the receiver. Data representative of the signal is stored in the database. Thereafter, the clamp releases the sensor assembly, retrieves the tool, and the manipulator moves the tool into contact with a workpiece that is being held by the holder. The computer system is also operable for generating a signal if the data in the database exceeds a predetermined value.

The present invention is capable of reducing the amount of time that a manufacturing machine is removed from service for full accuracy checks, and is also capable of obtaining and providing information about the accuracy of the manufacturing machine during times in which the manufacturing machine is in service but the clamp(s) of the manufacturing machine are "idle." Numerous advantages are provided by virtue of the present invention being capable of automatically, frequently, and conveniently verifying the accuracy of a manufacturing machine. For example, the manufacturing machine can accurately inspect a part manufactured thereby, which can reduce the need for post operation inspection. In addition, the present invention is capable of identifying accuracy problems with the manufacturing machine before those problems result in the fabrication of unacceptable parts.

BRIEF DESCRIPTION OF THE DRAWINGS

FIG. 10 schematically illustrates an Axis Data Set that is representative of Axis Data Sets included in the Benchmark Database and the Performance Database illustrated in FIG. 9, in accordance with the first embodiment of the present invention.

FIG. 11 schematically illustrates a Ring Data Set that is representative of Ring Data Sets included in the Benchmark Database and the Performance Database illustrated in FIG. 9, in accordance with the first embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
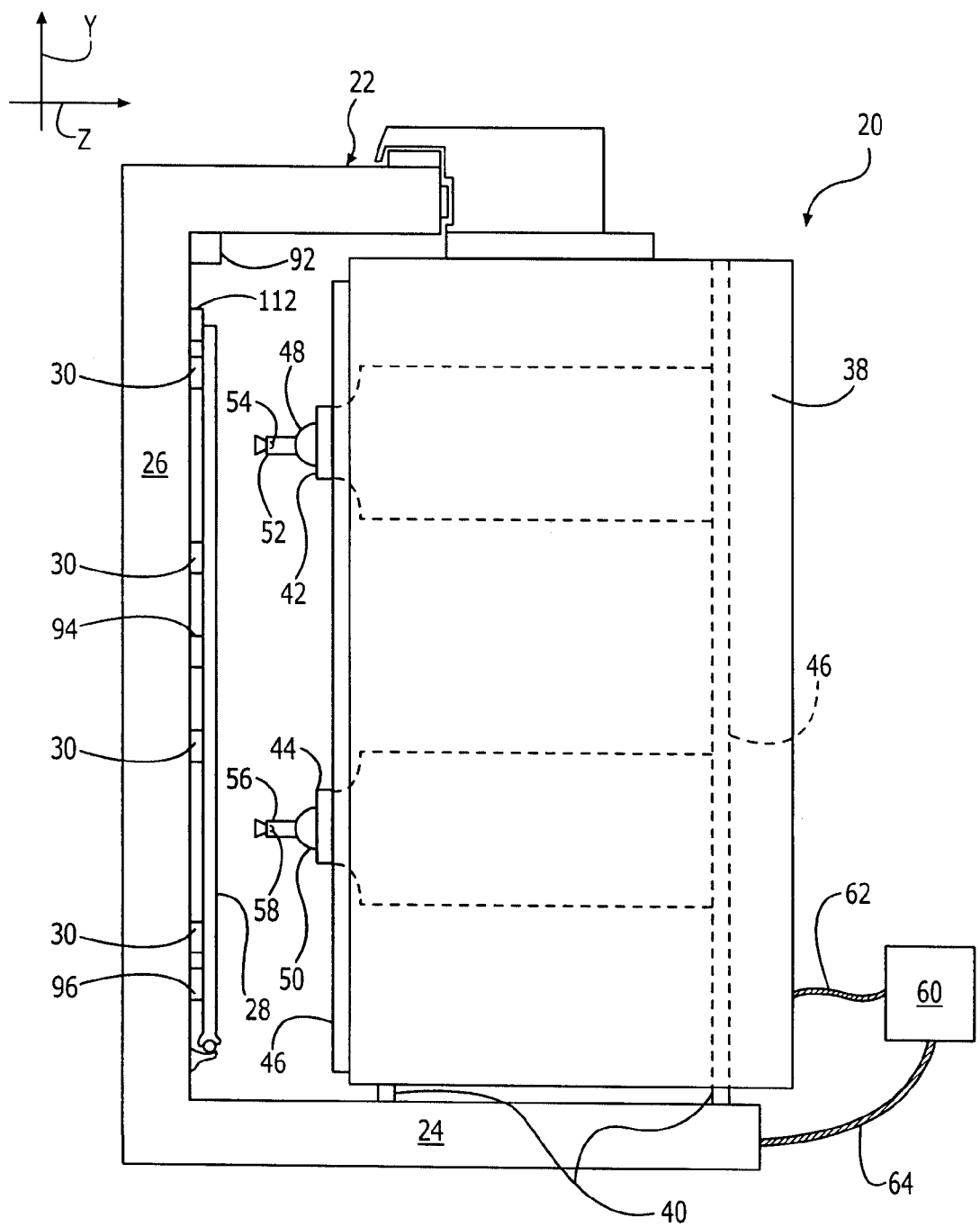
FIG. 1 is a schematic end elevation view of a numerically controlled/computer-operated manufacturing machine that is capable of manipulating tools to perform manufacturing tasks, and that is equipped with a certifying system, in accordance with a first embodiment of the present invention.
Figure 2:
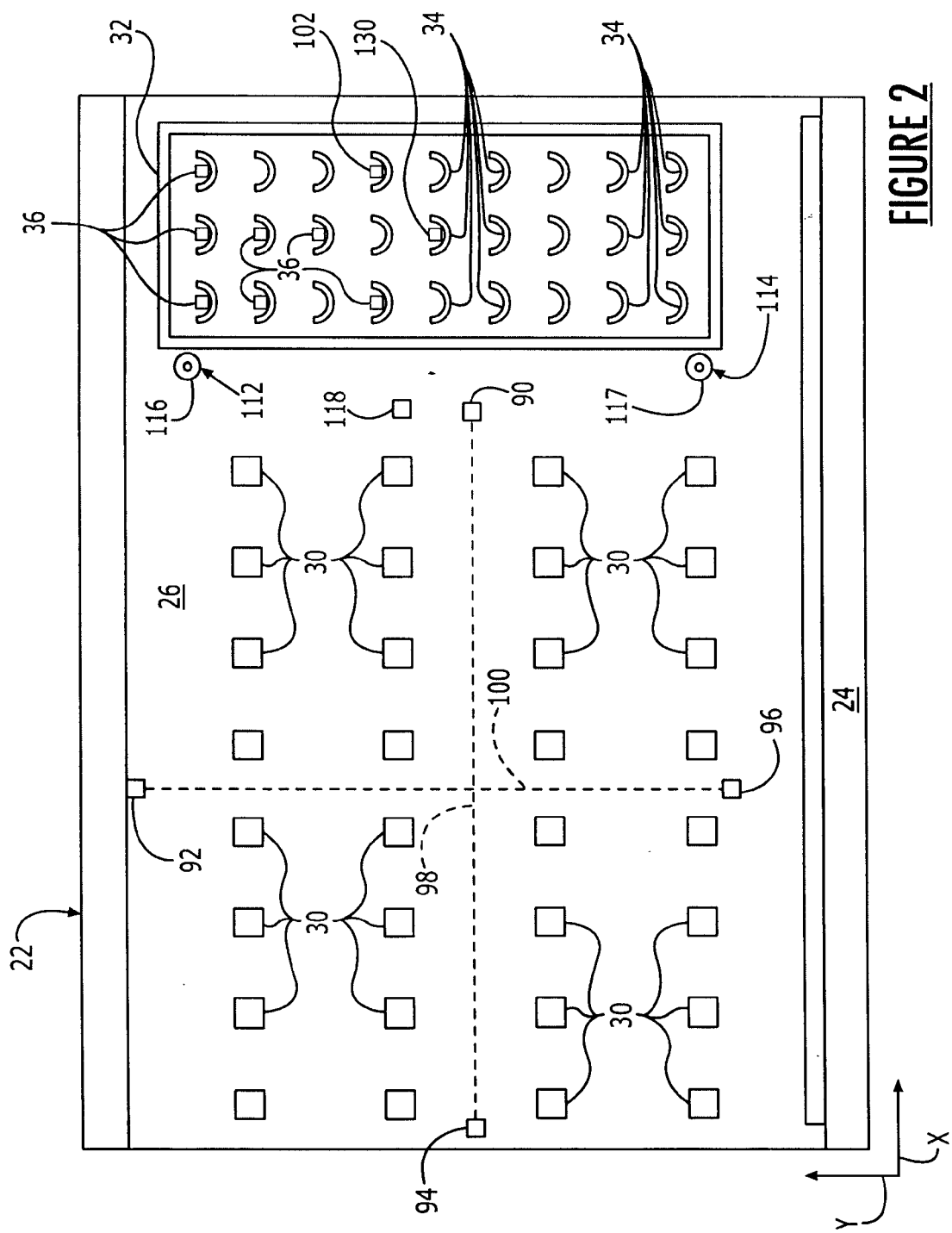
FIG. 2 is a schematic, isolated, front elevation view of a bed of the manufacturing machine of FIG. 1.

Referring to FIGS. 1 and 2, a numerically controlled/computer-operated manufacturing machine that includes a certifying system is generally indicated at 20, in accordance with a first embodiment of the present invention.

The certifying system includes measurement equipment that is dedicated to the manufacturing machine 20, and in accordance with the first embodiment, operations are performed to ensure that the dedicated measurement equipment accurately monitors the manufacturing machine so that the accuracy of the manufacturing machine can be frequently checked without fully removing the manufacturing machine from service and so that the manufacturing machine can accurately inspect the products it creates.

Some of the conventional aspects of the manufacturing machine 20 will initially be described, followed by a description that is more specifically directed to the certifying system of the present invention. Whereas the certifying system is described in the context of a particular type of manufacturing machine 20, different types of manufacturing machines and certifying systems that are capable of being associated with different types of manufacturing machines are within the scope of the present invention. For example and not limitation, the manufacturing machine of the present invention can be a horizontal or vertical bed, single or multiple spindle computer-operated manufacturing machine, or the like.

Conventional Aspects of the Manufacturing Machine

All of the conventional aspects of the manufacturing machine 20 are well known by or should at least be readily understandable by those of ordinary skill in the art. Accordingly, the conventional aspects of the manufacturing machine 20 are only briefly or generally described herein. Absent the certifying system, which will be discussed in greater detail below, the manufacturing machine of the first embodiment of the present invention is a conventional profiling machine that is controlled by an "open architecture-type" computer system, and an acceptable example of such a profiling machine is available as model Magnum H5 1000 from Cincinnati Machine of Cincinnati, Ohio.

The manufacturing machine 20 includes a bed 22 having a base 24 and an upright wall 26 extending upward from the base. Whereas, the manufacturing machine 20 of the first embodiment is a vertical bed machine, the invention is likewise applicable to horizontal bed machines and other types of machines. A holding system that is operative for releasably holding a workpiece 28 (e.g., the product produced or the material from which the product is formed) is mounted to the upright wall 26. In accordance with the first embodiment of the present invention, the holder system includes a two-dimensional array of electrically activated magnets 30, only a representative few of which are identified by their reference numeral in FIG. 2. The magnets 30 are energized to create a magnetic field that holds the workpiece/product 28 to the upright wall 26, and the magnets are de-energized to release the workpiece/product so that the workpiece/product can be removed from the upright wall.

The manufacturing machine 20 includes a tool rack 32 that is mounted to the bed 22 and defines multiple receptacles 34. The receptacles 34 are operative for removably holding a wide variety of different types of tools 36, such as, but not limited to, mills, dies, bits, and the like. Only a representative few of the receptacles 34 are specifically identified by their reference numeral in FIG. 2. The manufacturing machine 20 is operative for selecting and manipulating the tools 36 to manufacture a product from the workpiece 28 that is held by the holder system (e.g., magnets 30), as should be understood by those of ordinary skill in the art.

The manufacturing machine 20 includes a primary carriage 38 that is capable of being reciprocated relative to the base 24 of the bed 22 along a path that is parallel to an X Axis (see FIG. 2). The primary carriage 38 is movable through the operation of one or more linear motors that are schematically illustrated by primary tracks 40 that extend parallel to the X Axis and are positioned between the primary carriage and the base 24.

The manufacturing machine 20 includes upper and lower carriages 42, 44 that are capable of being reciprocated relative to the primary carriage 38 along a path that is parallel to a Y Axis (see FIGS. 1–2). The upper and lower carriages 42, 44 are movable through the operation of one or more linear motors that are schematically illustrated by secondary tracks 46 that extend parallel to the Y Axis.

The upper and lower carriages 42, 44 respectively carry upper and lower manipulators that are preferably in the form of upper and lower articulating arms 48, 50. Each articulating arm 48, 50 has a mounted end that is mounted to the respective carriage 42, 44. The end of the upper articulating arm 48 that is opposite from the mounted end thereof is in the form of an upper motor-driven spindle 52. The upper motor-driven spindle 52 includes an integral upper clamp 54. Likewise, the lower articulating arm 50 includes a lower motor-driven spindle 56 that includes an integral lower clamp 58. Each of the clamps 54, 58 is operative for gripping, manipulating and releasing tools 36 held by the tool rack 32 in the furtherance of performing manufacturing tasks, as should be understood by those of ordinary skill in the art.

The manufacturing machine 20 includes a computer system 60 that is operatively connected to the bed 22 and the primary carriage 38 via communication paths 62, 64. A conventional software module operates in conjunction with the computer system 60 so that the computer system provides instructions to the manufacturing machine 20 that result in the manufacturing machine performing its manufacturing tasks. There are many different conventional programming languages that are available and that can be readily used to create the conventional software module that operates in conjunction with the computer system 10 so that the manufacturing machine 20 performs its manufacturing tasks. It is preferred for the computer system 60 and its associated conventional software module to be of the "open architecture type" so that a software module of the present invention can additionally operate on the computer system 60 in the manner discussed in greater detail below.

Figure 3:
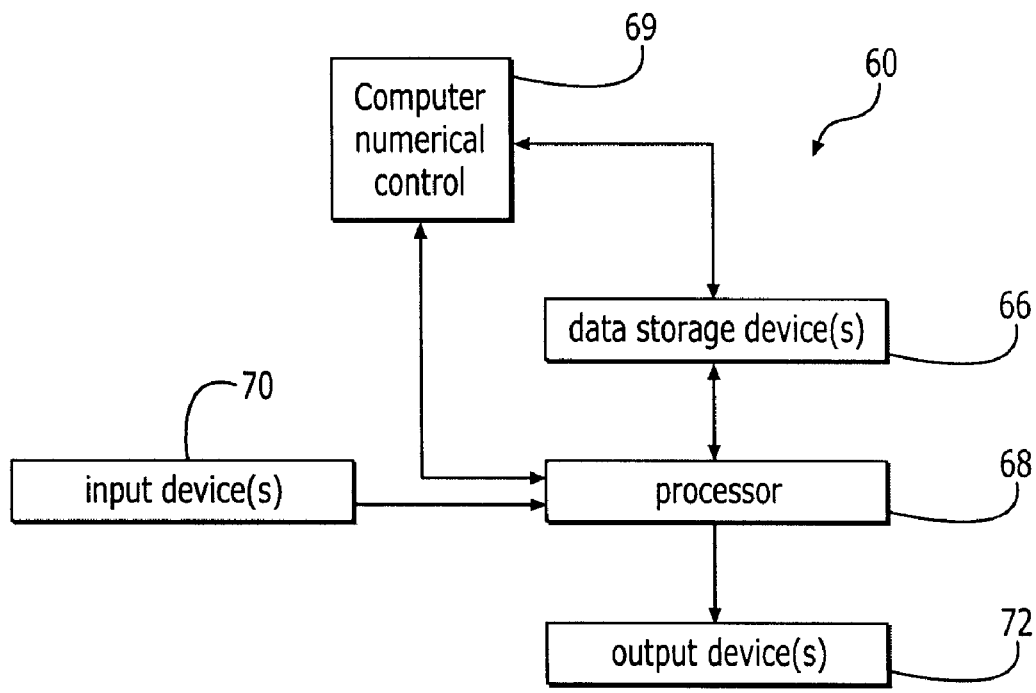
FIG. 3 diagrammatically illustrates a conventional open-architecture type of computer system of the manufacturing machine of FIG. 1 that is capable of operating in conjunction with a conventional software module to control operation of the manufacturing machine in a conventional manner, and that is further capable of operating in conjunction with a software module of the present invention to carry out operations of the present invention, in accordance with the first embodiment of the present invention.

An acceptable example of the computer system 60 is diagrammatically illustrated, in isolation, in FIG. 3. The computer system 60 includes one or more data storage devices 66, a processor 68, a computer numerical control 69, one or more input devices 70, and one or more output devices 72 that are connected and are capable of operating together in a conventional manner that is understood by those of ordinary skill in the art. The data storage device(s) 66 include computer-readable storage medium and can acceptably be in the form of hard disks and drives therefor, floppy disks and drives therefor, CD ROMs and drives therefor, digital video disks and drives therefor, memory cards, or any other type of computer-readable storage medium. The processor 68 is preferably a conventional computer processor. The input device(s) 70 preferably include one or more conventional components such as, but not limited to, a keyboard, a mouse, a virtual track ball, a light pen, voice recognition equipment, or the like. The output device(s) 72 preferably include one or more conventional components such as, but not limited to, a display that presents images on a screen, and a printer, or the like. Servo drives (not shown) and servo feedback positioning devices (not shown) are connected to and cooperate with the computer numerical control 69 in a conventional manner.

The conventional software module provides a graphical user interface via the display, and the graphical user interface includes multiple display screens that are presented to a user of the computer system 60 via the display. The display screens display information that a user has input or selected, and information that the conventional software module outputs. A user may input information in a conventional manner via the input device(s) 70.

The conventional software module contained by the computer system 60 is designed in a conventional manner to direct the operations of the manufacturing machine 20. For example, the conventional software module provides instructions that result in the activating and deactivating of the magnets 30, the moving of the primary carriage 38 back and forth along the primary tracks 40, and the moving of the upper and lower carriages 42, 44 back and forth along the secondary tracks. In addition, the conventional software module provides instructions that result in the articulating arms 48, 50 moving through their multiple degrees of freedom so that the clamps 54, 58 can carry tools and approach the workpiece 28 from a variety of different positions and in a variety of different orientations, as should be understood by those of ordinary skill in the art.

Figure 4:
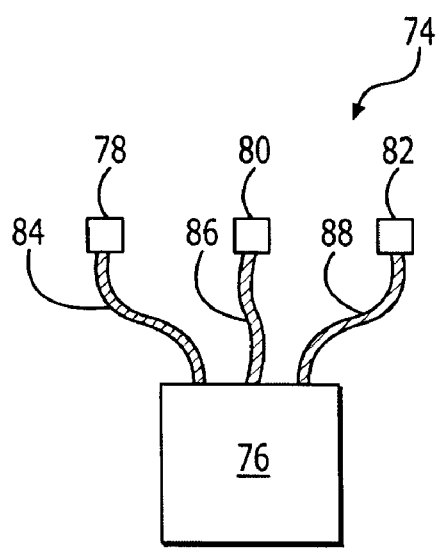
FIG. 4 schematically illustrates conventional measurement equipment of known accuracy that is capable of being used to determine the accuracy of the manufacturing machine of FIG. 1, in accordance with the first embodiment of the present invention.

It is common for the accuracy of the mechanical movements of the manufacturing machine 20 to degrade over time. It is conventional for the manufacturing machine 20 to be periodically removed from service so that its accuracy can be checked and the manufacturing machine can be adjusted, if necessary, to ensure that it is capable of accurately manufacturing parts. The accuracy of the manufacturing machine 20 can be checked with traditional metrological measurement equipment of known accuracy. For example, FIG. 4 schematically illustrates a conventional system of measurement equipment of known accuracy (MEKA) 74 that can be used to check the accuracy of the manufacturing machine 20 in a conventional manner. A typical system of MEKA 74 includes a computer system 76 that is not linked to the computer system 60 of the manufacturing machine 20, a laser transmitter 78, a laser receiver 80, and a ball-bar tester 82 that are respectively in communication with the computer system via communication paths 84, 86, 88. The system of MEKA 74 and a method of using it to check the accuracy of the manufacturing machine 20 are well known to those of ordinary skill in the art. In accordance with one embodiment of the present invention the system of MEKA 74 can be characterized as not being part of the certifying system of the present invention. In accordance with another embodiment the present invention includes performing operations with the system of MEKA 74 to check the accuracy of the manufacturing machine 20.

It is typical for the system of MEKA 74 to be a standalone system that does not remain with the manufacturing machine 20. It is typical for the system of MEKA 74 to be associated with the manufacturing machine 20 solely when the manufacturing machine is removed from service for the purpose of having a full accuracy check performed thereon.

Components of or Associated with the Certifying System

Components of the certifying system will now be described, in accordance with the first embodiment of the present invention. The certifying system operates in combination with the manufacturing machine 20 and the certifying system can be characterized as a system of machine-dedicated measurement equipment (MDME), because in contrast to the system of MEKA 74, the system of MDME preferably remains with the manufacturing machine 20 and is relatively frequently used in combination with the manufacturing machine.

In accordance with the first embodiment of the present invention, the certifying system (e.g., system of MDME) includes a software module that operates in conjunction with the computer system 60 and the above-discussed conventional software module to facilitate operations of the certifying system that are described in greater detail below. The software module of the certifying system can be directly associated with the computer system 60 if the computer system and the conventional software module are of an "open architecture type." Alternatively, if they are not of the "open architecture type," the software module of the certifying system may be directly associated with a supplemental computer system (not shown) that is interfaced with the computer system 60 and operates in conjunction with the computer system 60 to facilitate the operations of the certifying system that are described in greater detail below. For the sake of explanation this disclosure makes reference to separate software modules, namely the conventional software module and the software module of the certifying system. This distinction is made for purposes of clarification and not for purposes of limitation, as it is within the scope of the present invention for all operations, other than those that would clearly be performed by a human, to be controlled via instructions originating from a single software module.

Referring to FIG. 2, the certifying system (e.g., system of MDME) for the large bed manufacturing machine 20 of the first embodiment includes a pair of optical transmitters (e.g., stimulus devices) that are preferably X and Y laser transmitters 90, 92. A small bed machine may be configured with only one optical transmitter system for signal stimulation. The certifying system of the first embodiment also includes a pair of optical reflectors that are preferably X and Y laser reflectors 94, 96. The X laser transmitter 90 is operable for transmitting a pair of closely adjacent X laser beams 98 (e.g., optical stimulus in the form of beams of coherent light) that are parallel to one another and are diagrammatically illustrated by a single broken line in FIG. 2. It is also within the scope of the present invention for the X laser transmitter 90 to transmit a single X laser beam, so reference herein to the X laser beam 98 should be understood to alternatively mean either a single X laser beam or multiple parallel X laser beams, unless it is expressly indicated otherwise or it would be understood to be otherwise by those of ordinary skill in the art. Likewise, the Y laser transmitter 92 is operable for transmitting a pair of closely adjacent Y laser beams 100 (e.g., optical stimulus in the form of beams of coherent light) that are parallel to one another and are diagrammatically illustrated by a single broken line in FIG. 2. It is also within the scope of the present invention for the Y laser transmitter 92 to transmit a single Y laser beam, so reference herein to the Y laser beam 100 should be understood to alternatively mean either a single Y laser beam or multiple parallel Y laser beams, unless it is expressly indicated otherwise or it would be understood to be otherwise by those of ordinary skill in the art.

Each of the X and Y laser transmitters 90, 92 are preferably permanently mounted in fixed relation to the bed 22 of the manufacturing machine 20 so that the paths of the laser beams 98, 100 are fixed relative to the bed and the components mounted thereto, such as the magnets 30. The X laser transmitter 90 is mounted so that the X laser beam 98 initially extends parallel to the X Axis, and thereafter the X laser beam is reflected by the X laser reflector 94 and extends parallel to the Z Axis. Likewise, the Y laser transmitter 92 is mounted so that the Y laser beam 100 initially extends parallel to the Y Axis, and thereafter the Y laser beam is reflected by the Y laser reflector 94 and extends parallel to the Z Axis. Each of the X and Y laser transmitters preferably receive instructions from the computer system 60 via communication paths. Those communication paths are acceptably in the form of cables, or the like, a portion of which are not shown and a portion of which are incorporated into the communication path 64 by which the bed 22 communicates with the computer system 60.

Each of the X and Y laser transmitters 90, 92 can be equipped with a protective stainless steel cover (not shown). In accordance with one example, each of the protective covers is automatically opened when its transmitter is to be used, and closed when its transmitter is not being used. The opening and closing can be facilitated by conventional operating mechanisms, such as solenoids, pneumatic operators, hydraulic operators, or the like. An alternative protective cover embodies a positive pressure purge system with a fixed aperture for laser projection.

Figure 5:
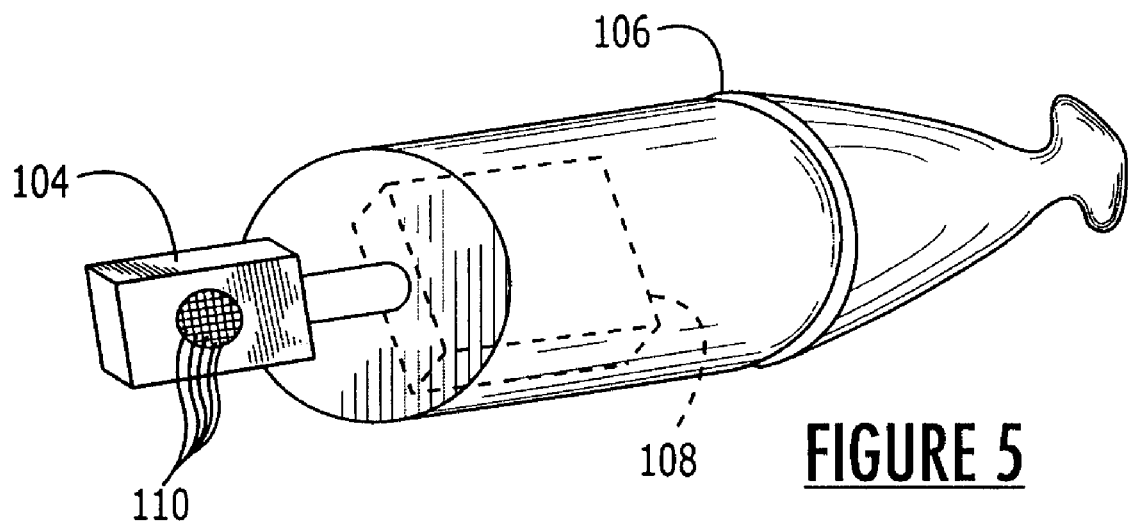
FIG. 5 is a schematic, isolated, perspective view of an optical sensor assembly that is capable of being removably held in a receptacle of a tool rack that is illustrated in FIG. 2 and is positioned on an upright wall of the bed of the manufacturing machine of FIG. 1, and that is capable of being releasably gripped by a clamp of an articulating arm carried by a movable carriage of the manufacturing machine of FIG. 1, in accordance with the first embodiment of the present invention.

Referring to FIGS. 2 and 5, the certifying system includes an optical sensor assembly 102 that is releasably held by a receptacle 34 of the tool rack 32. The optical sensor assembly 102 is used to check the straight axes of the manufacturing machine 20 by being moved along and sensing the laser beams 98, 100, as will be discussed in greater detail below. Referring to FIG. 5, the optical sensor assembly 102 includes an optical receiver 104 that is mounted to an adapter 106 that carries a radio frequency transmitter 108. The optical sensor assembly 102 preferably further includes one or more electrical batteries (not shown) that provide power to the powered components of the optical sensor assembly.

The adapter 106 is designed to be capable of being releasably gripped by either of the clamps 54, 58 of the articulating arms 48, 50. The optical sensor assembly 102 preferably also includes a switch (not shown), such as a suitably oriented mercury switch or the like, that is carried by the adapter 106. The switch turns on the optical sensor assembly 102 after it has been picked up by one of the clamps 54, 58 and moved to a predetermined orientation. The switch turns off the optical sensor assembly 102 when it is moved to a predetermined orientation (e.g., when it is replaced in the tool rack).

The optical receiver 104 is preferably a laser receiver that is used for sensing the X and Y laser beams 98, 100. The optical receiver 104 includes an array of sensors 110 that are each operative to provide an electrical signal in response to having light, such as laser beams 98, 100, incident thereon. For example, the sensors 110 can be photodiodes, charge-coupled devices, or the like. Only a representative few of the sensors 110 are identified by their reference numeral in FIG. 5. Each of the sensors 110 is connected by wires (not shown) to the transmitter 108 and the transmitter 108 transmits signals representative of the incidence of the laser beams 98, 100 upon each of the sensors 110. An acceptable transmitter 108 is an eight-channel digital transmitter, or the like, which can have wireless remote control capabilities, if desired. In accordance with the first embodiment of the present invention, one of the input devices 70 (FIG. 3) of the computer system 60 is a radio frequency receiver that is receptive to the signals transmitted by the transmitter 108. More specifically regarding the X and Y laser transmitters 90, 92 and the laser receiver 104, acceptable examples of those items are available as Model 50 and Model 60 laser systems from Automated Precision, Inc. located in Gaithersburg, Md.

Figure 6:
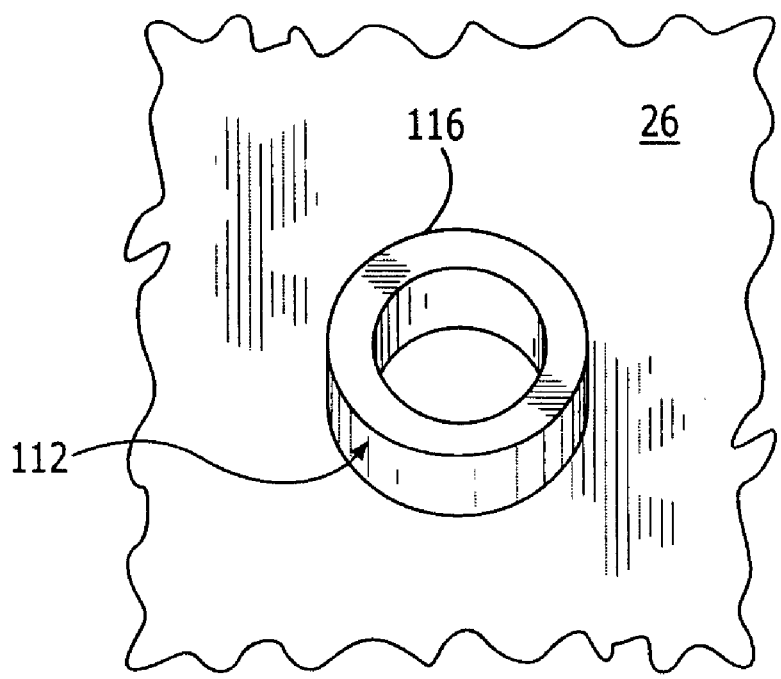
FIG. 6 is a perspective partial view illustrating a ring target mounted to the upright wall of the bed of the manufacturing machine of FIG. 1, in accordance with the first embodiment of the present invention.

Referring to FIGS. 2 and 6, the certifying system (e.g., system of MDME) is illustrated as including upper and lower ring targets 112, 114 (e.g., stimulus devices) that are mounted to the upright wall 26 of the bed 22. The certifying system may include more or less than the two ring targets 112, 114, and the ring targets may be located differently than is illustrated in FIG. 2. For example, in one embodiment it is preferred for the manufacturing machine 20 to be equipped with three ring targets. In accordance with the first embodiment of the present invention, each of the ring targets 112, 114 is preferably approximately eight inches in diameter and is placed at a convenient location on the bed 112 that is outside of the main work envelope of the manufacturing machine 20.

The upper ring target 112 illustrated in FIG. 6 is representative of the lower ring target 114. Referring to FIG. 6, and referring to FIG. 2 regarding the orientation of the X and Y Axes, the upper ring target 112 includes an annular peripheral edge 116 (e.g., mechanical stimulus) that extends in a plane that is parallel to both the X and Y Axes. Likewise, the lower ring target 114 includes an annular peripheral edge 117 (e.g., mechanical stimulus) that extends in a plane that is parallel to both the X and Y Axes. Each of the ring targets 112, 114 can alternatively be in the form of disks that respectively define the annular peripheral edges 116, 117.

Figure 7:
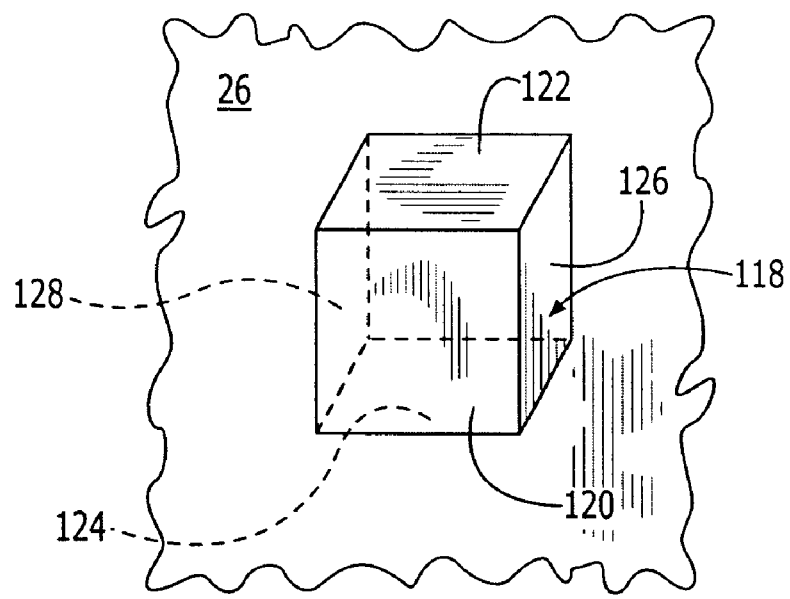
FIG. 7 is a partial view illustrating a cube target mounted to the upright wall of the bed of the manufacturing machine of FIG. 1, in accordance with the first embodiment of the present invention.

As best understood with reference to FIGS. 2 and 7, the certifying system (e.g., system of MDME) is illustrated as including a cube target 118 (e.g., stimulus device) that is mounted to the upright wall 26 of the bed 22. The certifying system may include more than one cube target 118, and the cube targets may be located differently than illustrated in FIG. 2. As best understood with reference to FIG. 7, and referring to FIGS. 1–2 regarding the orientation of the X, Y, and Z Axes that are perpendicular to one another and define a three-dimensional coordinate system, the cube target 118 includes multiple surfaces (e.g., mechanical stimuli). More specifically, the cube target 118 includes an X-Y surface 120 extending in a plane that is parallel to both the X and Y Axes. Likewise, the cube target 118 includes upper and lower X-Z surfaces 122, 124, each of which extends in a plane that is parallel to the X and the Z Axes. Likewise, the cube target 118 includes right and left Y-Z surfaces 126, 128, each of which extends in a plane that is parallel to both the Y and the Z Axes.

Each of the ring and cube targets 112, 114, 118 is preferably permanently mounted in fixed relation to the bed 22 of the manufacturing machine 20. In addition, each of the ring and cube targets 112, 114, 118 can be individually equipped with a protective stainless steel cover (not shown). In accordance with one example, each of the protective covers is automatically opened when its respective target 112, 114, 118 is to be used, and closed when its target is not being used. The opening and closing can be facilitated by conventional operating mechanisms, such as solenoids, pneumatic operators, hydraulic operators, or the like.

Figure 8:
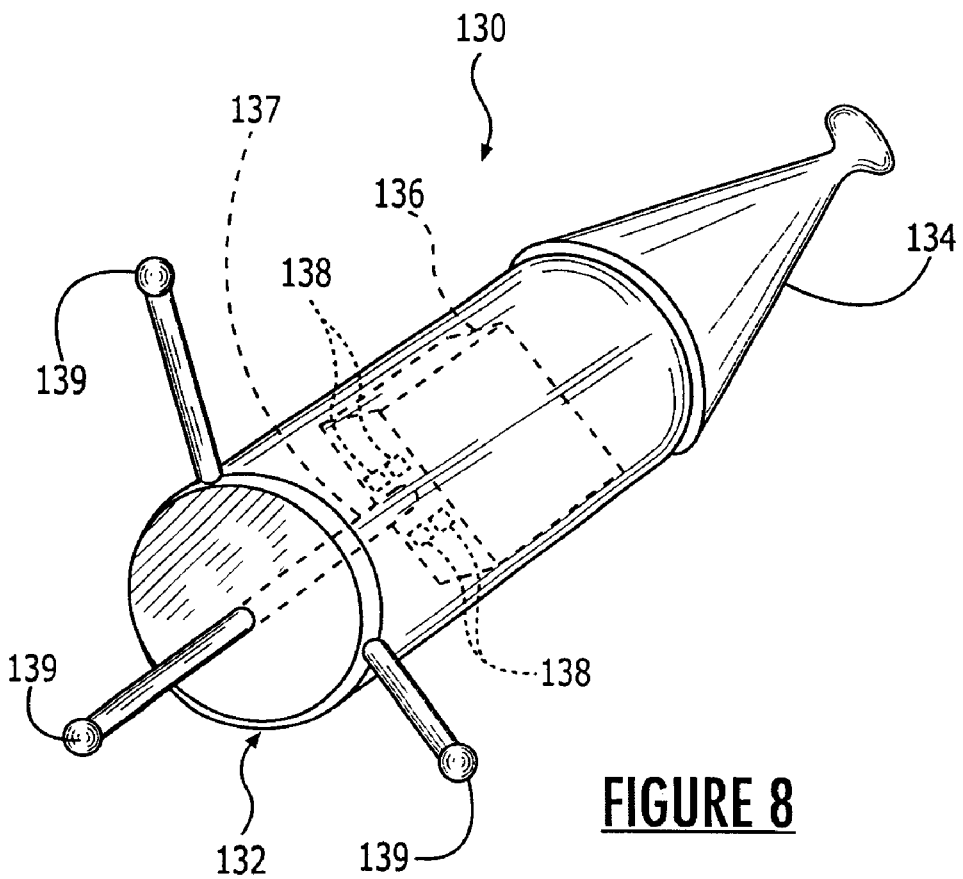
FIG. 8 is a schematic, isolated, perspective view of a mechanical sensor assembly that is capable of being removably held in a receptacle of the tool rack, and that is capable of being releasably gripped by a clamp of an articulating arm carried by a movable carriage of the manufacturing machine of FIG. 1, in accordance with the first embodiment of the present invention.

Referring to FIGS. 2 and 8, the certifying system (e.g., system of MDME) includes a mechanical sensor assembly 130 that is releasably held by a receptacle 34 of the tool rack 32. The mechanical sensor assembly 130 is used to check the rotational axes of the manufacturing machine 20, for example by engaging the ring and cube targets 112, 114, 118, as will be discussed in greater detail below. Data taken for the ring and cube targets 112, 114, 118 is indicative of how accurately the manufacturing machine 20 is moving in four, five, or six axis moves. This is an important aspect for any manufacturing machine performing swarfing or contouring cuts. The mechanical sensor assembly 130 is also used to inspect parts after they are machined from workpieces 28, as will be discussed in greater detail below.

Referring to FIG. 8, the mechanical sensor assembly 130 includes a touch probe 132 that is mounted to an adapter 134 that carries a radio frequency transmitter 136. The mechanical sensor assembly 130 preferably further includes one or more electrical batteries (not shown) that provide power to the powered components of the mechanical sensor assembly.

The adapter 134 is designed to be capable of being gripped by either of the clamps 54, 58 of the articulating arms 48, 50. The mechanical sensor assembly 130 preferably also includes a switch (not shown), such as a suitably oriented mercury switch or the like, that is carried by the adapter 134. The switch turns on the mechanical sensor assembly 130 after it has been picked by one of the clamps 54, 58 and moved to a predetermined orientation. The switch turns off the mechanical sensor assembly 130 when it is moved to a predetermined orientation (e.g., when it is replaced in the tool rack).

The touch probe 132 can be characterized as a sensing device that is used for sensing the ring and cube targets 112, 114, 118 and products manufactured from the workpieces 28 by the manufacturing machine 20. As one specific example, the touch probe 132 is used in accordance with the first embodiment of the present invention to perform tests that emulate sample ball-bar planar data (as noted in ASME 5.54 standard). The touch probe 132 includes an array of sensors 138, each of which is operative to provide an electrical signal in response to mechanical stress. In accordance with the first embodiment, the subject mechanical stress results from movement of an armature 137 that is caused by engagement between any one of several styli 139 and any one of the targets 112, 114, 118, or the like. Acceptable sensors include displacement transducers, such as linear variable differential transformers, strain gauges, piezoelectric crystals, or the like. Only a representative few of the sensors 130 are illustrated in FIG. 8. Each of the sensors is connected by wires (not shown) to the transmitter 136 and the transmitter 136 transmits signals representative of the stress experienced by each sensor 138. An acceptable transmitter 136 is an eight-channel digital transmitter, or the like, which can have wireless remote control capabilities, if desired. In accordance with the first embodiment of the present invention, one of the input devices 70 (FIG. 3) of the computer system 60 is a radio frequency receiver that is receptive to signals transmitted by the transmitter 136.

In accordance with the first embodiment, the touch probe 132 is similar to an API Scanning Touch Probe available from Automated Precision Inc. of Gaithersburg, Md. The touch probe 132 is a three-dimensional scanning touch probe capable of taking data at up to 1000 data points per second. The sensors 138 are capable of reading off-set of the styli 139 from a known origin in three dimensions. The touch probe 132 can also emulate a touch-trigger probe for individual data point sampling.

The touch probe 132 is used, for example, to collect data from the ring targets 112, 114. More specifically, the manufacturing machine 20 is programmed to cause the touch probe 132 to follow each planar circle on the ring targets 112, 114 so that the touch probe follows the machined face of the targets and measures the deflection from the programmed path. The touch probe 132 is used to collect ball-bar type data without removing the manufacturing machine 20 from service and without mounting a traditional ball-bar device to the manufacturing machine, as will be discussed in greater detail below.

As mentioned above, the certifying system (e.g., system of MDME) includes software module(s) that are operative in conjunction with the computer system 60 to facilitate operations of the certifying system, as will be discussed in greater detail below. Those software module(s) include or provide instructions that define databases that can be characterized as components of the certifying system. More specifically, and referring to FIG. 9, the certifying system includes a Benchmark Database 140 and a Performance Database 142 that are located in one or more of the data storage devices 66, or the like, operatively associated with the computer system 60. As will be discussed in greater detail below, the Benchmark Database 140 provides a basis against which information in the Performance Database 142 can be compared for the purpose of determining if the performance of the manufacturing machine 20 has degraded or is likely to degrade over time.

Figure 9:
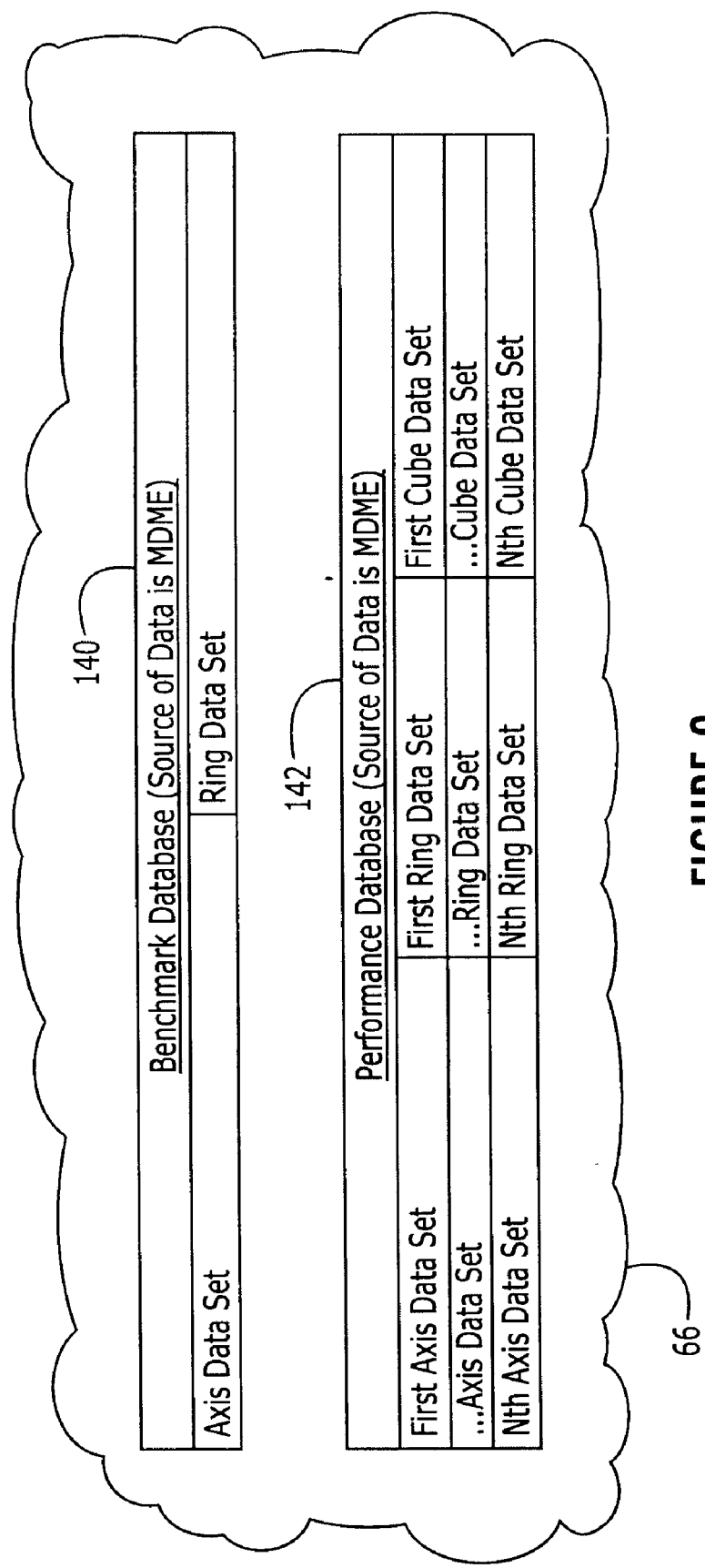
FIG. 9 schematically illustrates a Benchmark Database and a Performance Database contained by a computer-readable storage medium of the computer system of FIG. 3, in accordance with the first embodiment of the present invention.
Figures 12, 13:
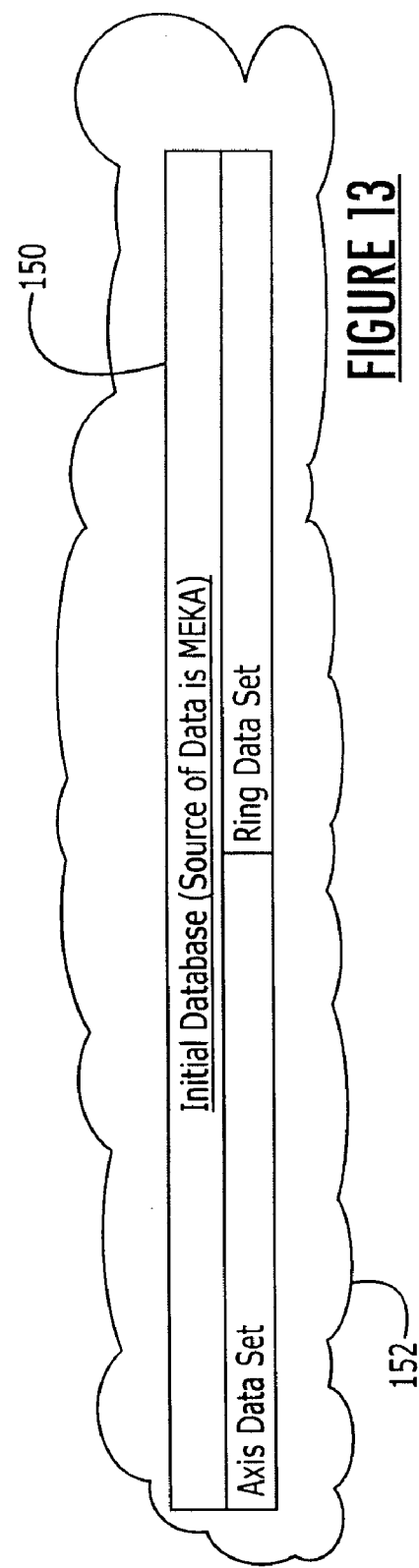
FIG. 12 schematically illustrates a Cube Data Set that is representative of Cube Data Sets included in the Performance Database illustrated in FIG. 9, in accordance with the first embodiment of the present invention.
FIG. 13 schematically illustrates an Initial Database contained by a computer-readable storage medium of the computer system of FIG. 4, in accordance with the first embodiment of the present invention.

As illustrated in FIG. 9, the Benchmark Database 140 includes an Axis Data Set and a Ring Data Set. Similarly, the Performance Database 142 includes First through Nth Axis Data Sets, First through Nth Ring Data Sets, and First through Nth Cube Data Sets. Examples of representative Axis, Ring, and Cube Data Sets 144, 146, 148 are respectively illustrated in FIGS. 10–12. The data sets illustrated in FIGS. 10–12 are exemplary in nature, and those of ordinary skill in the art will appreciate that it may be useful to obtain data in addition to, and data that is different from, that indicated in FIGS. 10–12. For example, for each of the X, Y, and Z Axes, also of interest may be angularity data, as will be discussed in greater detail below. In addition, it may be desirable for data to be collected for additional straight axes, additional ring targets, and additional cube targets, and these additions could be reflected in the data sets illustrated in FIGS. 10–12. The databases 140, 142 and data sets 144, 146, 148, and operations associated therewith, are further described below with reference to the operations of the certifying system. In addition, those of ordinary skill in the art will appreciate that data from the Axis Data Set 144 can be used to ascertain the squareness and perpendicularity of the manufacturing machine 20, and that data from the Ring Data Set can be used to analyze the interactions between all of the axes of the manufacturing machine.

Referring to FIG. 13, in accordance with the first embodiment of the present invention, one or more software modules of the system of MEKA 74 are set up so that the system of MEKA includes an Initial Database 150 located in one or more computer-readable storage mediums 152 operatively associated with the computer system 76 of the system of MEKA. In accordance with the first embodiment, the Initial Database 150 includes an Axis Data Set and a Ring Data Set, and the Axis and Ring Data Sets 144, 146 illustrated in FIGS. 10–11 are representative of the data sets of the Initial Database.

Operations Associated with the Certifying System

Generally described, the certifying system of the first embodiment of the present invention is at least operative for determining how accurately the manufacturing machine 20 is operating. Using data that is collected, for example as described below, accuracy determinations are calculated via software using methods of analysis that are based upon ASME 5.54 machine tool evaluation standards. In accordance with the first embodiment, data is preferably taken and analyzed to evaluate the following operational parameters of the manufacturing machine 20: velocity of movement; linear displacement accuracy; periodic errors; bi-directional repeatability; repeatability; straightness; angular errors of pitch, yaw and roll; linear axis squareness; contouring performance of X-Y, X-Z and Y-Z planes; and servo balance and adjustment. Preferably all measurements are maintained within plus or minus ten percent of benchmark data established when the manufacturing machine 20 is prepared for release to production.

Figure 14A:
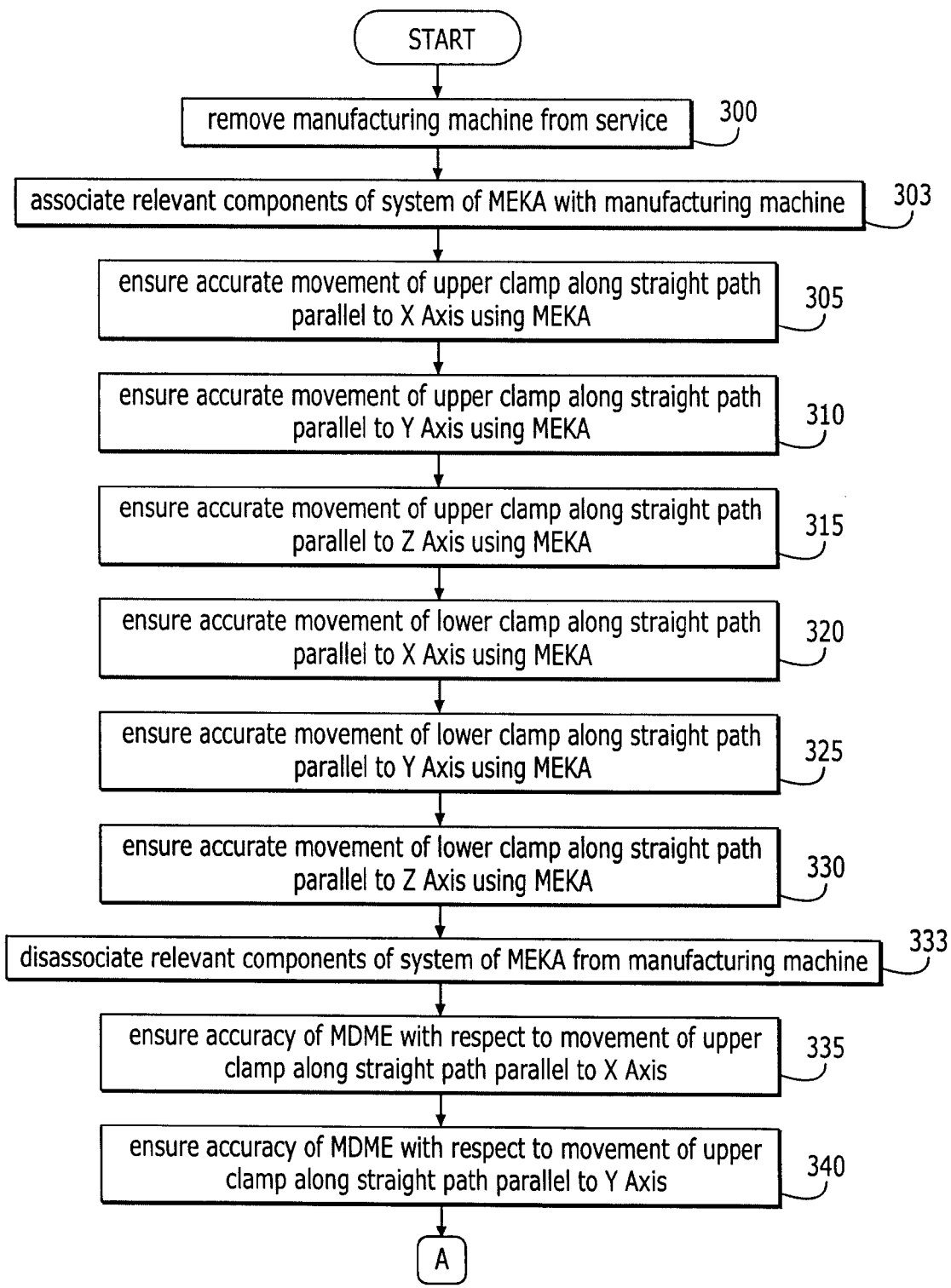
FIGS. 14A–B present a flow chart illustrating high level operations performed in association with items illustrated in FIGS. 1–13, in accordance with the first embodiment of the present invention.
Figure 14B:
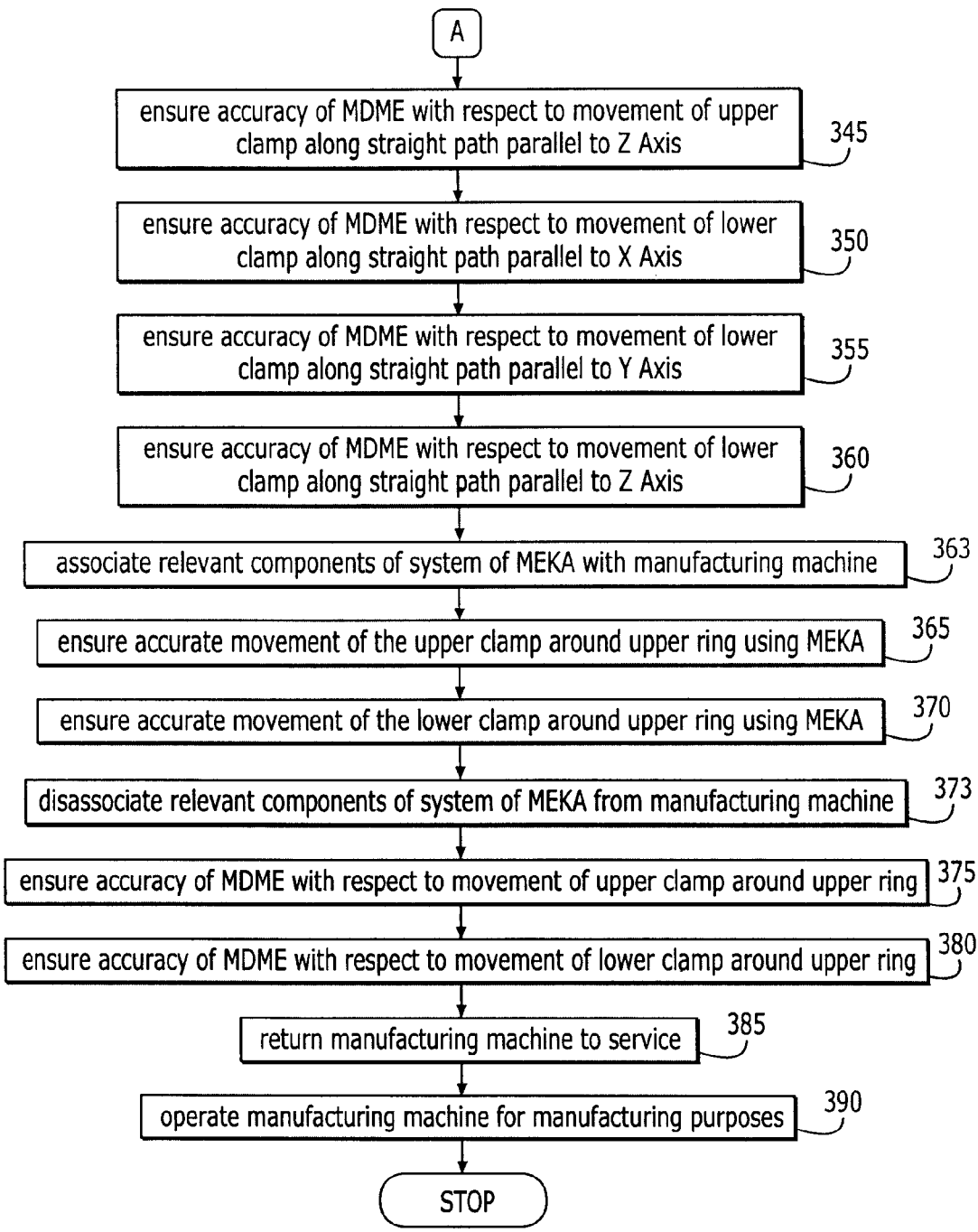

FIGS. 14A–B present a flow chart illustrating exemplary high level operations performed in association with the certifying system (e.g., system of MDME), in accordance with the first embodiment of the present invention. At step 300 the manufacturing machine 20 is removed from service, meaning that the manufacturing machine is no longer operated to manufacture products from workpieces 28. At step 303 components of the system of MEKA 74 that are used in the furtherance of steps 305, 310, 315, 320, 325, and 330 are at least initially associated with the manufacturing machine 20, as will become apparent from the following.

Operations performed at steps 305, 310, 315, 320, 325, and 330 ensure that subsequent thereto the manufacturing machine 20 is operative to accurately move the upper and lower clamps 54, 58 along straight paths. The operations performed at steps 305, 310, 315, 320, 325, and 330 each include operations illustrated by and described with reference to FIG. 15.

Figure 15:
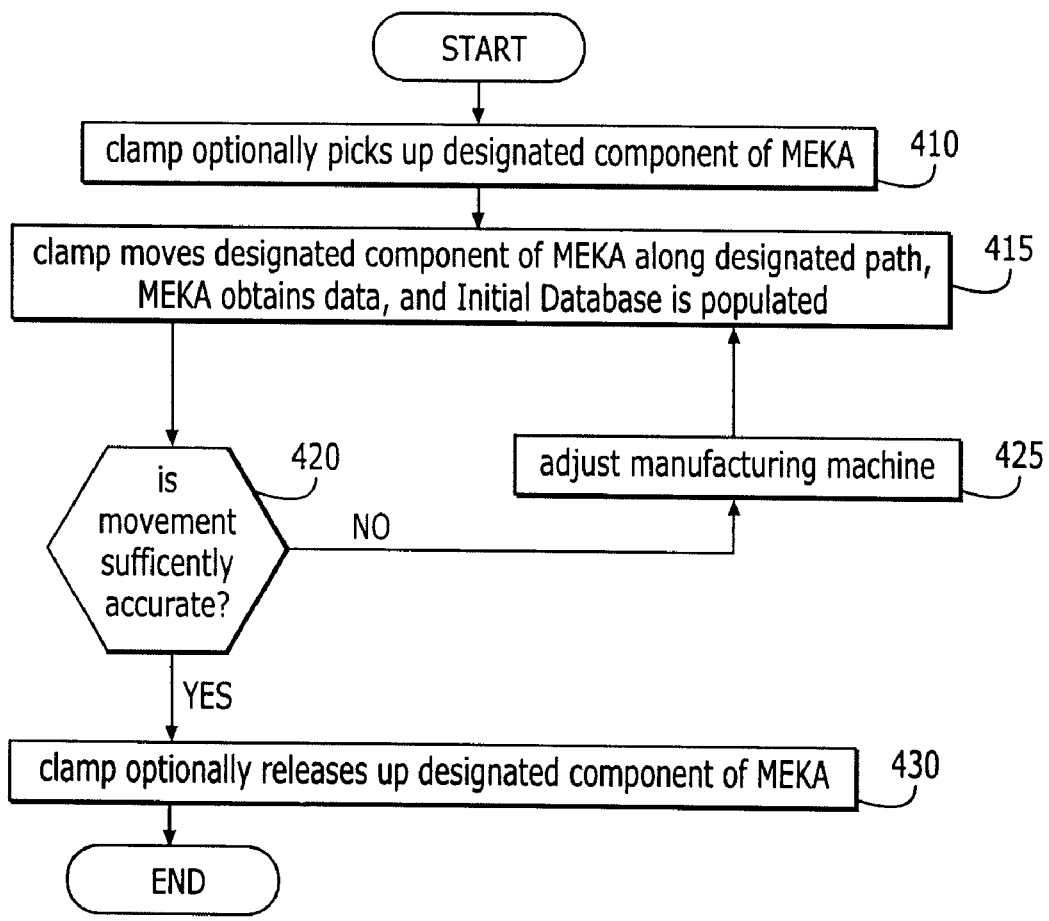
FIG. 15 presents a flow chart illustrating operations performed using the conventional measurement equipment of known accuracy illustrated in FIG. 4 in the furtherance of checking and adjusting the accuracy of the manufacturing machine of FIG. 1 while it is out of service, in accordance with the first embodiment of the present invention.

At steps 305, 310, and 315 operations that are illustrated by and described with reference to FIG. 15 are performed to ensure that the manufacturing machine 20 is operative to accurately move the upper clamp 54 along straight paths that are respectively parallel to the X, Y, and Z Axes. These operations involve the system of MEKA 74. More specifically, and as will best be understood with reference to the operations illustrated by and described with reference to FIG. 15, at steps 305, 310, and 315 the designated component of the system of MEKA 74 that is gripped by the upper clamp 54 is the laser receiver 80. At steps 305, 310, and 315 the laser receiver 80 is used in combination with the laser transmitter 78 of the system of MEKA to ensure accurate movement of the upper clamp 54 along straight paths that are respectively parallel to the X, Y, and Z Axes.

At steps 320, 325, and 330 operations that are illustrated by and described with reference to FIG. 15 are performed to ensure that the manufacturing machine 20 is operative to accurately move the lower clamp 58 along straight paths that are respectively parallel to the X, Y, and Z Axes. These operations involve the system of MEKA 74. More specifically, and as will best be understood with reference to the operations illustrated by and described with reference to FIG. 15, at steps 320, 325, and 330 the designated component of the system of MEKA 74 that is gripped by the lower clamp 58 is the laser receiver 80. At steps 320, 325, and 330 the laser receiver 80 is used in combination with the laser transmitter 78 of the system of MEKA to ensure accurate movement of the lower clamp 58 along straight paths that are respectively parallel to the X, Y, and Z Axes.

At step 333 components of the system of MEKA 74 that were associated with the manufacturing machine in the furtherance of steps 303, 305, 310, 315, 320, 325, and 330 are at least partially disassociated with the manufacturing machine.

Operations performed at steps 335, 340, 345, 350, 355, and 360 are performed to ensure that thereafter the system of MDME is capable of accurately monitoring movements of the upper and lower clamps 54, 58 along straight paths that are respectively parallel to the X, Y and Z Axes. The operations performed at steps 335, 340, 345, 350, 355, and 360 each include the operations illustrated by and described with reference to FIG. 16.

Figure 16:
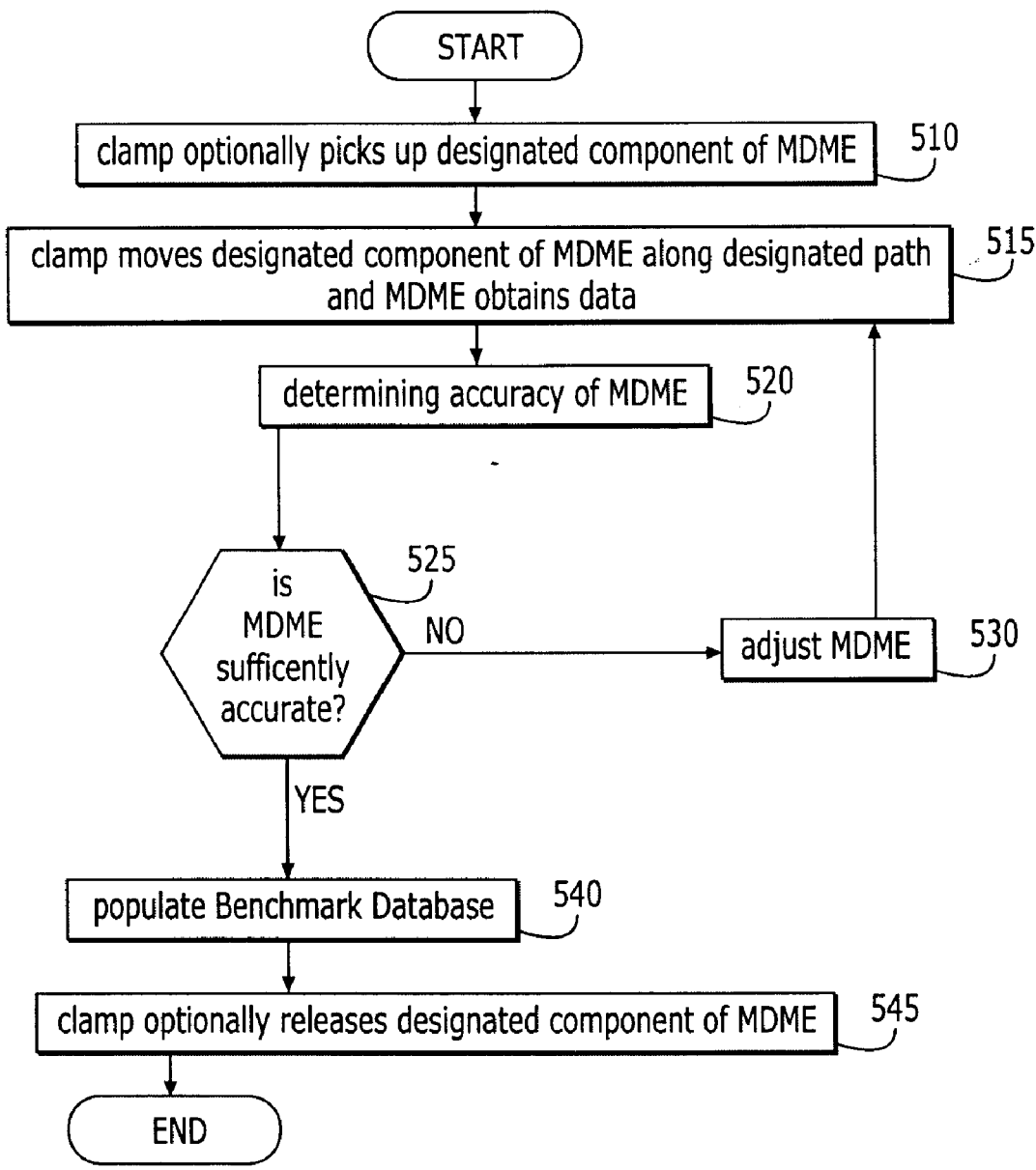
FIG. 16 presents a flow chart illustrating operations performed to establish and adjust the accuracy of machine-dedicated measurement equipment for the manufacturing machine of FIG. 1, in accordance with the first embodiment of the present invention.

At step 335 operations that are described below with reference to FIG. 16 are performed to ensure that subsequent thereto the system of MDME is capable of accurately monitoring movement of the upper clamp 54 along a straight path parallel to the X Axis. The straight path utilized at step 335 is preferably at least proximate and parallel to, and most preferably coaxial with, the straight path used at step 305. More specifically, and as will best be understood with reference to the operations described below with reference to FIG. 16, at step 335 the designated component of the system of MDME that is gripped by upper clamp 54 is the optical sensor assembly 102, and the path along which the optical sensor assembly is moved is at least a portion of the path defined by the X laser beam 98 between the X laser transmitter 90 and the X laser reflector 94.

At step 340 operations that are described below with reference to FIG. 16 are performed to ensure that subsequent thereto the system of MDME is capable of accurately monitoring movement of the upper clamp 54 along a straight path parallel to the Y Axis. The straight path utilized at step 340 is preferably at least proximate and parallel to, and most preferably coaxial with, the straight path used at step 310. More specifically, and as will best be understood with reference to the operations described below with reference to FIG. 16, at step 340 the designated component of the system of MDME that is gripped by upper clamp 54 is the optical sensor assembly 102, and the path along which the optical sensor assembly is moved is at least a portion of the path defined by the Y laser beam 100 between the Y laser transmitter 92 and the Y laser reflector 96.

At step 345 operations that are described below with reference to FIG. 16 are performed to ensure that subsequent thereto the system of MDME is capable of accurately monitoring movement of the upper clamp 54 along a straight path parallel to the Z Axis. The straight path utilized at step 345 is preferably at least proximate and parallel to, and most preferably coaxial with, the straight path used at step 315. More specifically, and as will best be understood with reference to the operations described below with reference to FIG. 16, at step 345 the designated component of the system of MDME that is gripped by upper clamp 54 is the optical sensor assembly 102, and the path along which the optical sensor assembly is moved is at least a portion of the path defined by the X laser beam 100 that has been reflected by the X laser reflector 94.

At step 350 operations that are described below with reference to FIG. 16 are performed to ensure that subsequent thereto the system of MDME is capable of accurately monitoring movement of the lower clamp 58 along a straight path parallel to the X Axis. The straight path utilized at step 350 is preferably at least proximate and parallel to, and most preferably coaxial with, the straight path used at step 320. More specifically, and as will best be understood with reference to the operations described below with reference to FIG. 16, at step 350 the designated component of the system of MDME that is gripped by the lower clamp 58 is the optical sensor assembly 102, and the path along which the optical sensor assembly is moved is at least a portion of the path defined by the X laser beam 100 between the X laser transmitter 92 and the X laser reflector 96.

At step 355 operations that are described below with reference to FIG. 16 are performed to ensure that subsequent thereto the system of MDME is capable of accurately monitoring movement of the lower clamp 58 along a straight path parallel to the Y Axis. The straight path utilized at step 355 is preferably at least proximate and parallel to, and most preferably coaxial with, the straight path used at step 325. More specifically, and as will best be understood with reference to the operations described below in regards to FIG. 16, at step 355 the designated component of the system of MDME that is gripped by lower clamp 58 is the optical sensor assembly 102, and the path along which the optical sensor assembly is moved is at least a portion of the path defined by the Y laser beam 100 between the Y laser transmitter 92 and the Y laser reflector 96.

At step 360 operations that are described below with reference to FIG. 16 are performed to ensure that subsequent thereto the system of MDME is capable of accurately monitoring movement of the lower clamp 58 along a straight path parallel to the Z Axis. The straight path utilized at step 360 is preferably at least proximate and parallel to, and most preferably coaxial with, the straight path used at step 330. More specifically, and as will best be understood with reference to the operations described below with reference to FIG. 16, at step 360 the designated component of the system of MDME that is gripped by the lower clamp 58 is the optical sensor assembly 102, and the path along which the optical sensor assembly is moved is at least a portion of the path defined by the Y laser beam 100 that has been reflected by the Y laser reflector 96.

At step 363 components of the system of MEKA 74 that are used in the furtherance of steps 365 and 370 are at least initially associated with the manufacturing machine 20.

At steps 365 and 370 operations that are described with reference to FIG. 15 are performed to ensure that subsequent thereto the manufacturing machine 20 is operative to accurately move the upper and lower clamps 54, 58 respectively around proximate the upper and lower annular peripheral edges 116, 117 (e.g., along curved paths). These operations involve the system of MEKA 74. More specifically, and as will best be understood with reference to the operations illustrated by and described in regards to FIG. 15, at steps 365 and 370 the designated component of the system of MEKA 74 that is respectively gripped by the upper and lower clamps 54, 58 is an appropriate portion of the ball-bar tester 82 of the system of MEKA. The ball-bar tester is used to test movement of the upper and lower clamps 54, 58 respectively around proximate the upper and lower annular peripheral edges 116, 117, as should be understood by those of ordinary skill in the art. Other ball-bar tests are preferably performed by conventional methods at various points on the manufacturing machine 20 in an effort to make certain that no locational variables are present that will detrimentally affect the accuracy of the manufacturing machine.

At step 373 components of the system MEKA 74 that were associated with the manufacturing machine 20 in the furtherance of steps 363, 365, and 370 are at least partially disassociated with the manufacturing machine 20. At steps 375 and 380 operations that are described below with reference to FIG. 16 are performed to ensure that subsequent thereto the system of MDME is capable of accurately monitoring movement of the upper and lower clamps 54, 58 respectively around proximate the upper and lower annular peripheral edges 116, 117. More specifically, and as will best be understood with reference to the operations described below with reference to FIG. 16, at steps 375 and 380 the designated component of the system of MDME that is gripped by the clamps 54, 58 is the mechanical sensor assembly 130. At steps 375 and 380 the touch probe 132 of the mechanical sensor assembly 130 is respectively engaged to and moved around the upper and lower annular peripheral edges 116, 117, as is discussed in greater detail below.

The movements performed and data collected in the furtherance of the operations of steps 335, 340, 345, 350, 355, 360, 375, and 380 simulate the movements performed and data collected in the furtherance of the operations of steps 305, 310, 315, 320, 325, 330, 365, and 370, respectively. That is, and for example, the movement of the upper clamp 54 during step 335 simulates the movement of the upper clamp during step 305, and the data collected regarding movement of the upper clamp during step 335 simulates the data collected regarding movement of the upper clamp during step 305.

In accordance with the first embodiment, steps 300–380 are performed immediately after each of the following events and prior to releasing the manufacturing machine 20 for production: installation of a new manufacturing machine after purchase, installation of an existing machine after relocation, after any program excursion resulting in a crash of any clamp or tool with the machine bed or production part that renders the machine unable to operate within the predetermined parameters of the present invention, and after physical replacement of hardware or software resulting in the machine being unable to operate within the predetermined parameters of the present invention.

At step 385 the manufacturing machine 20 is returned to service or is at least prepared for being returned to service. At step 390 the manufacturing machine 20 is operated for manufacturing purposes by performing the operations that are illustrated by and described with reference to FIGS. 17A–B, and some of those operations involve the system of MDME, as is discussed in greater detail below.

The operations illustrated by FIG. 15 will now be described, in accordance with the first embodiment of the present invention. As indicated above, the operations that are illustrated by and described with reference to FIG. 15 are performed for each of steps 305, 310, 315, 320, 325, 330, 365, and 370 (FIG. 14). For each pass through the operations described with reference to FIG. 15, the clamp, the designated component of the system of MEKA 74, and the path along which the clamp moves the designated component of the system of MEKA are as specified by the respective one of the steps 305, 310, 315, 320, 325, 330, 365, and 370 on whose behalf the operations of FIG. 15 are currently being performed.

At step 410, the clamp grips and picks up the designated component of the system of MEKA 74. At step 415 the manufacturing machine 20 is operated so that the clamp moves the designated component along the designated path. At step 415 the system of MEKA 74 also obtains data regarding the movement of the designated component that is occurring at the current performance of step 415. At step 415 the system of MEKA 74 also functions so that the respective portion of the Initial Database 150 is populated with the data obtained at the current performance of step 415. At step 420 a determination is made as to whether the data collected at the most recent occurrence of step 415 is indicative of that movement being sufficiently accurate, such as by being within specifications supplied by the manufacturer of the manufacturing machine 20. If a negative determination is made at step 420, the manufacturing machine 20 is adjusted in a manner that should be understood by those of ordinary skill in the art in an effort to improve the accuracy of the manufacturing machine. If a positive determination is made at step 420, control is transferred to step 430 where the clamp releases the designated component of the system of MEKA 74.

More specifically, at steps 410 and 430 the clamp optionally respectively picks up and releases the designated component of the system of MEKA 74 because when subsequent ones of steps 305, 310, 315, 320, 325, 330, 365, or 370 (FIG. 14) utilize the same designated component of the system of MEKA it is preferred that appropriate ones of steps 410 and 430 be omitted to avoid having to pick up a designated component immediately after releasing the same designated component. Throughout this disclosure, when reference is made to either one of the clamps 54, 58 picking up an item, it is preferred for the item to be gripped and picked up from the tool rack 32 through the movement of and actions of the clamp. Likewise, throughout this disclosure, when reference is made to either one of the clamps 54, 58 releasing an item, it is preferred for the item to be returned to the tool rack 32 through the movement of and actions of the clamp.

The operations illustrated by FIG. 16 will now be described, in accordance with the first embodiment of the present invention. As indicated above the operations that are illustrated by and described with reference to FIG. 16 are performed for each of steps 335, 340, 345, 350, 355, 360, 375, and 380 (FIG. 14). For each pass through the operations described with reference to FIG. 16, the clamp, the designated component of the system of MDME 74, and the path along which the clamp moves the designated component of the system MDME are as specified by the respective one of the steps 335, 340, 345, 350, 355, 360, 375, and 380 on whose behalf the operations of FIG. 16 are currently being performed.

At step 510, the clamp grips and picks up the designated component of the system of MDME 74. At step 515 the manufacturing machine 20 is operated so that the clamp moves the designated component along the designated path. In addition, at step 515 the system of MDME 74 obtains data regarding the movement occurring at the current performance of step 515.

When step 515 is carried out in the furtherance of steps 335, 340, 345, 350, 355, and 360, the designated component is the optical sensor assembly 102 and the optical receiver 104 is used to sense either the X or Y laser beam 98, 100, depending upon the designated path. For each of steps 335, 340, 345, 350, 355, and 360, the designated path is defined so as to include a series of serially arranged points, and those points are represented in the Axis Data Set 144, where it is illustrated that each series includes First through Nth Points. For example, a minimum of thirty points and a maximum of fifty points are preferably selected along each path over thirty-six inches long, and paths under thirty-six inches long preferably have a minimum of ten points and a maximum of thirty points. The points are preferably equally spaced along the paths.

In accordance with the first embodiment of the present invention, data for at least two parameters is obtained for each point. The first parameter pertains to the position coordinates of the optical sensor assembly 102. Data for this parameter is derived based upon a determination of which of the sensors 110 senses the respective laser beam. The second parameter pertains to the velocity of the optical sensor assembly 102. Data for this second parameter is derived based upon the amount of time it takes pulses of the respective laser beam 98 or 100 to reach the optical receiver 104. In accordance with another embodiment, data for a third parameter is obtained for each point. Data for this third parameter is indicative of the angular orientation of the optical sensor assembly 102. Data for the third parameter is derived based upon the difference in the amount of time it takes for the two parallel X laser beams 98 to reach the optical receiver 104, or the difference in the amount of time it takes for the two parallel Y laser beams 100 to reach the receiver.

When step 515 is carried out in the furtherance of steps 375 and 380, the designated component is the mechanical sensor assembly 130 and the touch probe 132 is preferably engaged to and senses the entirety of the upper and lower annular peripheral edges 116, 117 to emulate ball-bar testing. In accordance with the first embodiment of the present invention, for each of steps 375 and 380, the designated path is defined so as to include a series of serially arranged points, and those points are represented in the Ring Data Set 146, where it is illustrated that each series of points includes First through Nth Points. The points are preferably equally spaced along the paths. In accordance with the first embodiment of the present invention, data for at least one parameter is obtained for each point. As illustrated in FIG. 11, the parameter pertains to the positional coordinates of the sensor assembly 130.

Whereas the operations of step 515 that are carried out in the furtherance of steps 375 and 380 have been described above in the context of obtaining data at specific points, in one embodiment of the present invention all data obtained with respect to the peripheral edges 116, 117 is obtained using circular interpolation techniques, and those circular interpolation techniques should be understood by those of ordinary skill in the art. In accordance with one example, when step 515 is carried out for each of steps 375 and 360, it is preferred for the touch probe 132 to be moved so as to trace the respective annular peripheral edge 116, 117 three times in clockwise and counterclockwise directions, and for the data obtained to be averaged.

At step 520 calculations are performed to determine the accuracy of the system of MDME based at least upon the data obtained at the most recent occurrence of step 515 and the corresponding data most recently obtained at step 415 for the corresponding movement. For example, when the operations of FIG. 16 are performed in the furtherance of step 335, the accuracy determination made at step 520 is based upon the information obtained at the most recent occurrence of step 515 and the information obtained at the most recent occurrence of step 415 that occurred during the most recent occurrence of step 305. Likewise, when the operations of FIG. 16 are performed in the furtherance of step 340, the accuracy determination made at step 520 is based upon the information obtained at the most recent occurrence of step 515 and the information obtained at the most recent occurrence of step 415 that occurred during the most recent occurrence of step 310. Likewise, when the operations of FIG. 16 are performed in the furtherance of step 345, the accuracy determination made at step 520 is based upon the information obtained at the most recent occurrence of step 515 and the information obtained at the most recent occurrence of step 415 that occurred during the most recent occurrence of step 315. Likewise, when the operations of FIG. 16 are performed in the furtherance of step 350, the accuracy determination made at step 520 is based upon the information obtained at the most recent occurrence of step 515 and the information obtained at the most recent occurrence of step 415 that occurred during the most recent occurrence of step 320. Likewise, when the operations of FIG. 16 are performed in the furtherance of step 355, the accuracy determination made at step 520 is based upon the information obtained at the most recent occurrence of step 515 and the information obtained at the most recent occurrence of step 415 that occurred during the most recent occurrence of step 325. Likewise, when the operations of FIG. 16 are performed in the furtherance of step 360, the accuracy determination made at step 520 is based upon the information obtained at the most recent occurrence of step 515 and the information obtained at the most recent occurrence of step 415 that occurred during the most recent occurrence of step 330. Likewise, when the operations of FIG. 16 are performed in the furtherance of step 375, the accuracy determination made at step 520 is based upon the information obtained at the most recent occurrence of step 515 and the information obtained at the most recent occurrence of step 415 that occurred during the most recent occurrence of step 365. Likewise, when the operations of FIG. 16 are performed in the furtherance of step 380, the accuracy determination made at step 520 is based upon the information obtained at the most recent occurrence of step 515 and the information obtained at the most recent occurrence of step 415 that occurred during the most recent occurrence of step 370.

More specifically, in accordance with the first embodiment of the present invention, the accuracy determination is made at step 520 by determining the percentage difference between the data obtained at the most recent occurrence of step 515 and the corresponding data in the initial database 150.

At step 525 a determination is made as to whether the accuracy determined at step 520 is sufficient. In accordance with one example, the accuracy determined at step 520 is sufficient if it is plus or minus ten percent, although in accordance with other examples greater and lesser accuracy can be acceptable. If a negative determination is made at step 525, control is transferred to step 530, where the system of MDME is adjusted appropriately in an effort to increase its accuracy. The system of MDME is not adjusted to compensate for errors associated with the manufacturing machine 20, but the system of MDME 13 is initially adjusted so that the data collected by the system of MDME closely conforms to the corresponding data collected by the system of MEKA. If a positive determination is made at step 525, control is transferred to step 540, and the respective location of the Benchmark Database 140 is populated with the data obtained at the most recent performance of step 515.

At step 545 the clamp releases the designated component of the system of MDME. More specifically, at steps 510 and 545 the clamp optionally respectively picks up and releases the designated component of the system of MDME because when subsequent ones of steps 335, 340, 345, 350, 355, 360, 375, and 380 (FIG. 14) utilize the same designated component of the system of MDME it is preferred that appropriate ones of steps 510 and 545 be omitted to avoid having to pick up a designated component immediately after releasing the same designated component.

Figure 17A:
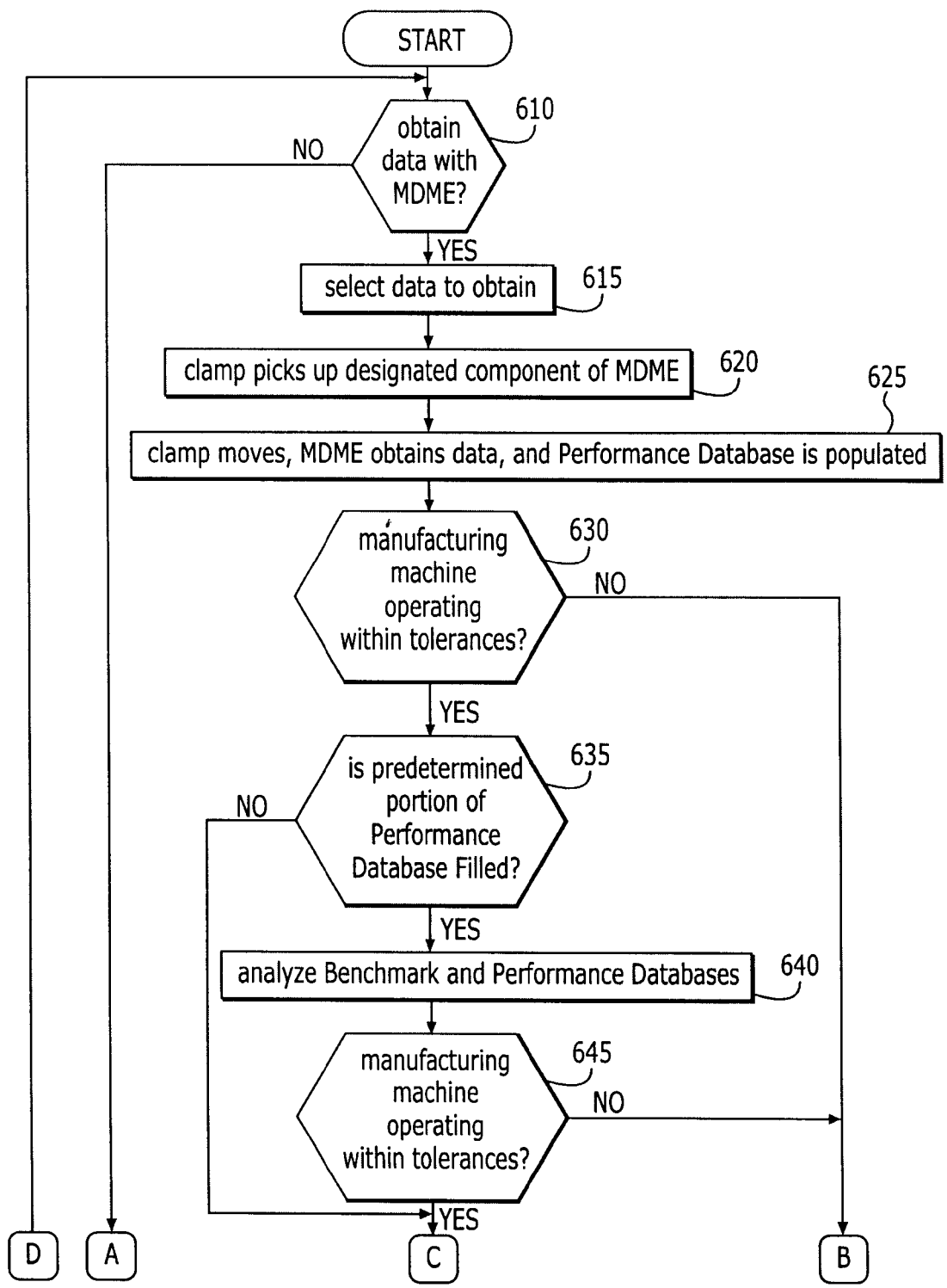
FIGS. 17A–B present a flow chart illustrating operations performed while the manufacturing machine of FIG. 1 is in service, and those operations include manufacturing parts, ascertaining the accuracy of the manufacturing machine using the machine-dedicated measurement equipment, and inspecting the manufactured parts.
Figure 17B:
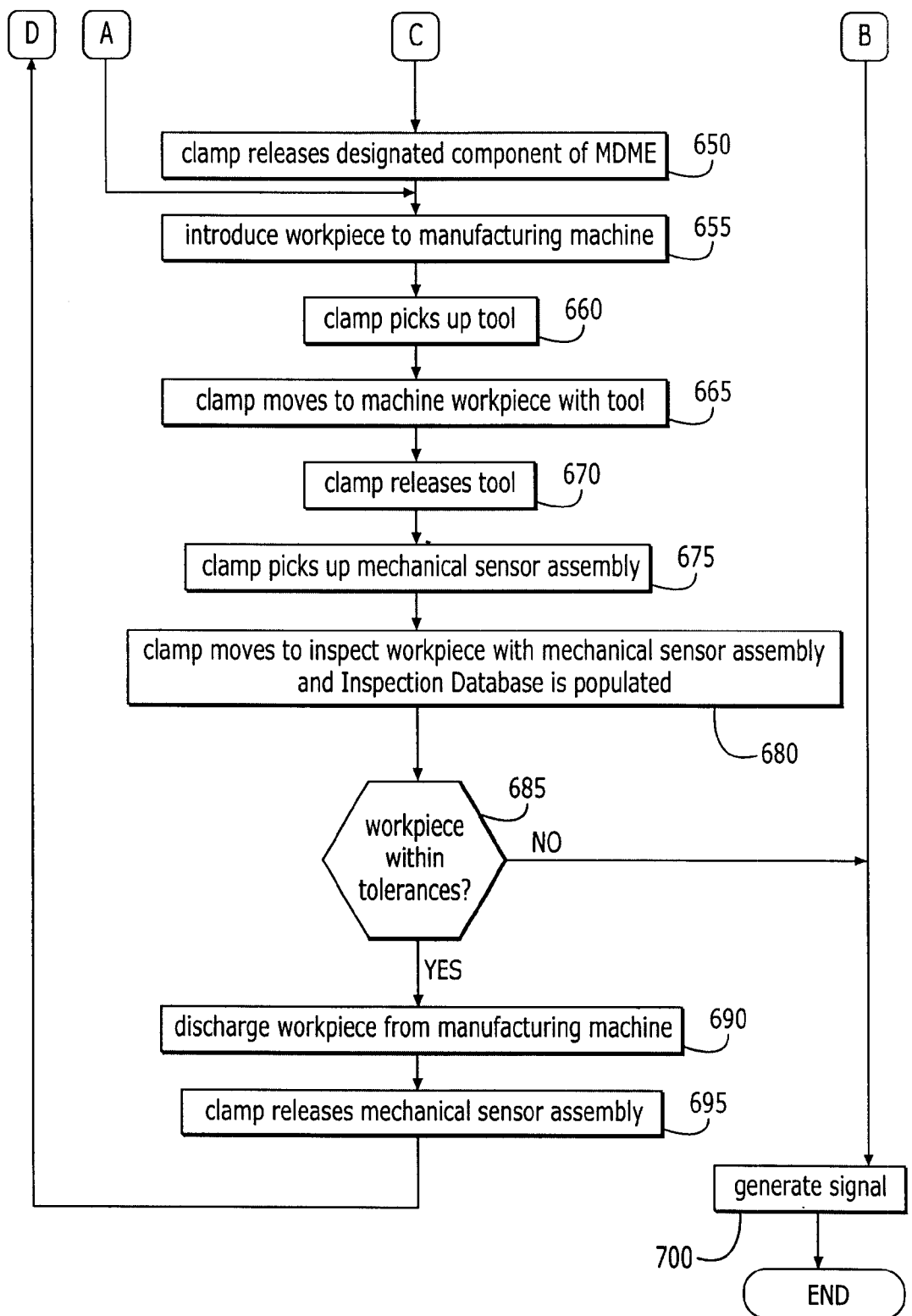

The operations illustrated by FIGS. 17A–B will now be described, in accordance with the first embodiment of the present invention. The operations illustrated by and described with reference to FIGS. 17A–B are performed in the furtherance of step 390 of FIG. 14B. At step 610 a determination is made as to whether data for the Performance Database 142 is to be obtained with the system of MDME. This determination can be made in a variety of different ways. As one example, the certifying system can be set up so that data for the Performance Database 142 is obtained with the system of MDME at periodic time intervals.

Referring to FIG. 9, in accordance with the first embodiment of the present invention the Performance Database 142 can be characterized as including multiple data packages that play a role in the determination made at step 610. More specifically, a first data package includes the First Axis Data Set, the First Ring Data Set, and the First Cube Data Set (i.e., the first row of the Performance Database 142); a second data package includes the Second Axis Data Set, the Second Ring Data Set, and the Second Cube Data Set (i.e., the second row of the Performance Database); a . . . data package includes the . . . Axis Data Set, the . . . Ring Data Set, and the . . . Cube Data Set (i.e., the . . . row of the Performance Database); and an Nth data package includes the Nth Axis Data Set, the Nth Ring Data Set, and the Nth Cube Data Set (i.e., the Nth row of the Performance Database). The operations associated with step 610 are preferably performed so that the data packages are filled sequentially and so that each piece of the data that is used for the filling is obtained at no more frequently than a predetermined time interval. The predetermined time interval can be a certain number of minutes or hours, or the like, that the manufacturing machine 20 is in operation. For example, it is preferred for the operations resulting from steps 610–650 to take only a little, if any, time away from the production time of the manufacturing machine 20. In accordance with one particular example, it is preferred for the operations resulting from steps 610–650 to consume only approximately one percent of the manufacturing machine's production time on a daily basis. Of course the predetermined time interval is preferably small enough so that any problems with the manufacturing machine 20 do not go undetected for too long. If a negative determination is made at step 610, control is transferred to step 655. If a positive determination is made at step 610, control is transferred to step 615.

At step 615 a determination is made as to which data for the Performance Database is to be obtained. In accordance with the first embodiment, each of the sequentially filled data packages of the Performance Database is completely filled before data is collected for subsequent data packages. Therefore, at step 615 a query is performed to determine if there is a data package that is in the process of being filled. If so, then data for that partially filled data package will be obtained. If not, then data for the subsequent data package will be obtained. Once the data package for which data is to be obtained is identified, then the data that is to be obtained for that data package is selected. For example, the data to be obtained will not be duplicative to data already obtained for the subject data package and can be selected through the use of some type of conventional random selection routine.

At step 620 the clamp 54 or 58 that is used to obtain the data identified at the most recent occurrence of step 615 picks up the grippable component of the system of MDME that is used to obtain the data identified at the most recent occurrence of step 615 (i.e., the clamp picks up one of the sensor assemblies 102, 130). The clamp 54 or 58 that is used to obtain the data identified at the most recent occurrence of step 615 is referred to herein as the selected clamp. The grippable component of the system of MDME that is used to obtain the data identified at the most recent occurrence of step 615 is referred to herein as the selected component. The data identified at the most recent occurrence of step 615 is referred to herein as the selected data.

At step 625 the manufacturing machine 20 is operated so that the selected clamp moves the selected component in the manner that is required to obtain the selected data. The movement of the selected component by the selected clamp in the manner that is required to obtain the selected data is referred to herein as the selected movement. In addition, at step 625 the system of MDME obtains the selected data, and that data is appropriately recorded in the Performance Database.

Examples of the selected movements carried out at subsequent operations of step 625 will now be described. The selected movements carried out at subsequent operations of step 625 at least simulate and are preferably identical to the operations of step 515 carried out respectively at steps 335, 340, 345, 350, 355, 360, 375, and 380 (FIG. 14), which are described above. The selected movements carried out at subsequent operations of step 625 also include moving the touch probe 132 of the mechanical sensor assembly 130 into contact with each of the X-Y, upper X-Z, lower X-Z, right Y-Z, and left Y-Z surfaces 120, 122, 124, 126 and 128 of the cube target via respective movement of both the upper and lower clamps 54, 58.

At step 630 a determination is made as to whether the manufacturing machine 20 is operating within tolerances. More specifically, where possible the determination is made as to whether the data obtained at the immediately preceding step 625 is within tolerances with respect to corresponding data in the Benchmark Database 150. For example, it may be required that all data obtained for the Performance Database 142 be within plus or minus one percent of the corresponding data in the Benchmark Database 140. Or, if corresponding data is not included in the Benchmark Database 140, it may be required that the determination at step 630 be based on predetermined expectations. For example when the touch probe 132 of the mechanical sensor assembly 130 is brought into contact with the cube target 118 at step 625, the data obtained at step 625 can pertain to which of the sensors 138 was triggered and to what degree. As one example, in the scenario of the preceding sentence it can be deemed at step 630 that the manufacturing machine 20 is within tolerances if only the tip sensor 138 was triggered at step 625 and that triggering did not exceed a predetermined value. If a negative determination is made at step 630, control is transferred to step 700. If a positive determination is made at step 630, control is transferred to step 635.

At step 635 a determination is made as to whether a predetermined portion of the Performance Database 142 is filled. More specifically, at step 635 it is determined whether the data placed in the Performance Database 142 at the most recent occurrence of step 625 resulted in the completion of the process of filling one of the data packages of the Performance Database with data. If a negative determination is made at steps 635, control is transferred to step 650. If a positive determination is made at step 635, control is transferred to step 640.

At step 640 the entire Performance Database 142 is analyzed in view of the Benchmark Database 140. The analysis performed at step 640 can result in the resetting of tolerances that are used in the determinations made at steps 630 and 645, or the like. At step 645 a determination is made based on an analysis of the entire Performance Database 142 in view of the Benchmark Database 140 as to whether the manufacturing machine 20 is operating within tolerances or is anticipated to continue operating within tolerances. For example, at step 645 trends in the data of the Performance Database 142 may be analyzed in an effort to determine if the manufacturing machine 20 is likely to begin operating unacceptably in the near future. If it is determined that the manufacturing machine 20 is likely to operate unacceptably in the near future a negative determination will be made at step 645. If a negative determination is made at step 645, control is transferred to step 700. If a positive determination is made at step 645, control is transferred to step 650.

At step 650, the selected clamp releases the selected component of the system of MDME that was gripped at step 620. More specifically, that selected component of the system of MDME is returned to the tool rack 32 at step 650.

At steps 655, 660, 665, and 670 the manufacturing machine 20 operates in a conventional manner to manufacture a part from a workpiece 28, as should be understood by those of ordinary skill in the art. More specifically and for example, at step 655 a workpiece 28 is introduced to and secured to the manufacturing machine 20 via operation of the magnets 30 so that the workpiece is prepared for being machined by the manufacturing machine. At step 660 the clamp 54 or 58 picks up a tool 36, and at step 665 the clamp moves the tool so that a part is formed from the workpiece introduced to the manufacturing machine at step 655. At step 670 the clamp releases the tool 36 gripped at step 660, and more specifically that tool is returned to the tool rack 32. Of course steps 660, 665, and 670 may be repeated numerous times for both of the clamps 54, 58 to facilitate the forming of a part from the workpiece 28, as should be understood by those of ordinary skill in the art.

At step 675 the clamp 54 or 58 picks up the mechanical sensor assembly 130 from the tool rack 32. At step 680 the part/workpiece 28 that was most recently manufactured by the manufacturing machine 20 and is still held by the magnets 30 is inspected. More specifically, at step 680 the clamp 54 or 58 moves the touch probe 132 of the mechanical sensor assembly 130 across the part that was manufactured from the workpiece 28 during the most recent occurrence of step(s) 665 and that remains held to the bed 22 by the magnets 30. Step 680 may be reperformed in a loop-like fashion so that both of the clamps 54, 58 are used in the inspection of the part/workpiece 28. Inspection data collected at step 680 is placed within a Quality Control Database (not shown), and at step 685 that data is compared to expected data to determine if the inspected part/workpiece 28 is within predetermined tolerances. More specifically, the inspection data collected at step 680 is illustrative of the actual configuration of the manufactured part/workpiece 28, and that actual configuration is compared to the desired configuration of the part that the manufacturing machine 20 was programmed to provide. If a negative determination is made at step 685, control is transferred to step 700. If a positive determination is made at step 685, control is transferred to step 690. In addition, data is preferably added to and accumulated in the Quality Control Database each time step 680 is performed, and that accumulated data can be analyzed and trended in a variety of different manners to provide meaningful information about, and appropriate warnings with respect to, the operational characteristics of the manufacturing machine 20.

At step 690 the part/workpiece 28 that has been most recently manufactured by and inspected by the manufacturing machine 20 is discharged from the manufacturing machine, such as by de-energizing the magnets 30. At step 695, which could be performed before step 690, the clamp 54 or 58 releases the mechanical sensor assembly 130, and more specifically the clamp returns the mechanical sensor assembly to the tool rack 32. Control is transferred from step 695 to step 610.

Control is transferred to step 700 when a negative determination is made at any of steps 630, 645, or 685. At step 700 the certifying system functions to generate a signal that is indicative of the manufacturing machine 20 not operating within tolerances, and in accordance with one example the signal is operative to shut down the manufacturing machine.

If the manufacturing machine 20 is not operating within tolerances, the Performance Database 142 and the Benchmark Database 140 can be analyzed, and often from that analysis it will become apparent to maintenance personnel which axis or element of the manufacturing machine needs to be adjusted or repaired, as should be understood by those of ordinary skill in the art. For example, corrective actions performed by maintenance personnel can include adjustments to mechanical drives, bearings, gibbs and ways, servo motors, positioning feedback devices, and the like.

In accordance with the first embodiment of the present invention, a computer program product includes a computer-readable storage medium having a software module, which can be characterized as computer-readable program code means having a series of computer instructions that are embodied in the computer-readable storage medium, for facilitating the operations of the method of the present invention, which are discussed above. In this regard, FIGS. 14A–B, 15–16, and 17A–B can be characterized as block diagram, flow chart and control flow illustrations of methods, systems and program products according to the invention. It will be understood that each block or step of the block diagram, flow chart and control flow illustrations, and combinations of blocks in the block diagram, flow chart and control flow illustrations, can be implemented by computer program instructions.

More specifically, in accordance with the first embodiment of the present invention, all of the operations described above, except for those carried out by a user of the present invention, are preferably implemented by computer program instructions. These computer program instructions may be loaded onto a computer or other programmable apparatus to produce a machine, such that the instructions which execute on the computer or other programmable apparatus create means for implementing the functions specified in the block diagram, flow chart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flow chart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flow chart or control flow block(s) or step(s).

Accordingly, blocks or steps of the block diagram, flow chart or control flow illustrations support combinations of means for performing the specified functions, combinations of steps for performing the specified functions and program instruction means for performing the specified functions. It will also be understood that each block or step of the block diagram, flow chart or control flow illustrations, and combinations of blocks or steps in the block diagram, flow chart or control flow illustrations, can be implemented by special purpose hardware-based computer systems which perform the specified functions or steps, or combinations of special purpose hardware and computer instructions.

Those skilled in the art will appreciate that there are many different conventional programming languages that are available and that can be readily used to create the software module of the present invention. Acceptable programming languages are the Valisys and Caps & Edges brand programming languages. The software module of the present invention preferably operates in conjunction with a conventional computer system, an acceptable example of which is diagrammatically illustrated in FIG. 3. The software module of the present invention preferably provides a graphical user interface via the display 72, and the graphical user interface includes multiple display screens that are presented to a user of the software module via the display. The display screens display information that a user has input or selected, and information that the software module outputs. A user may input information in a conventional manner via the input device 70.

Second Embodiment

Figure 18:
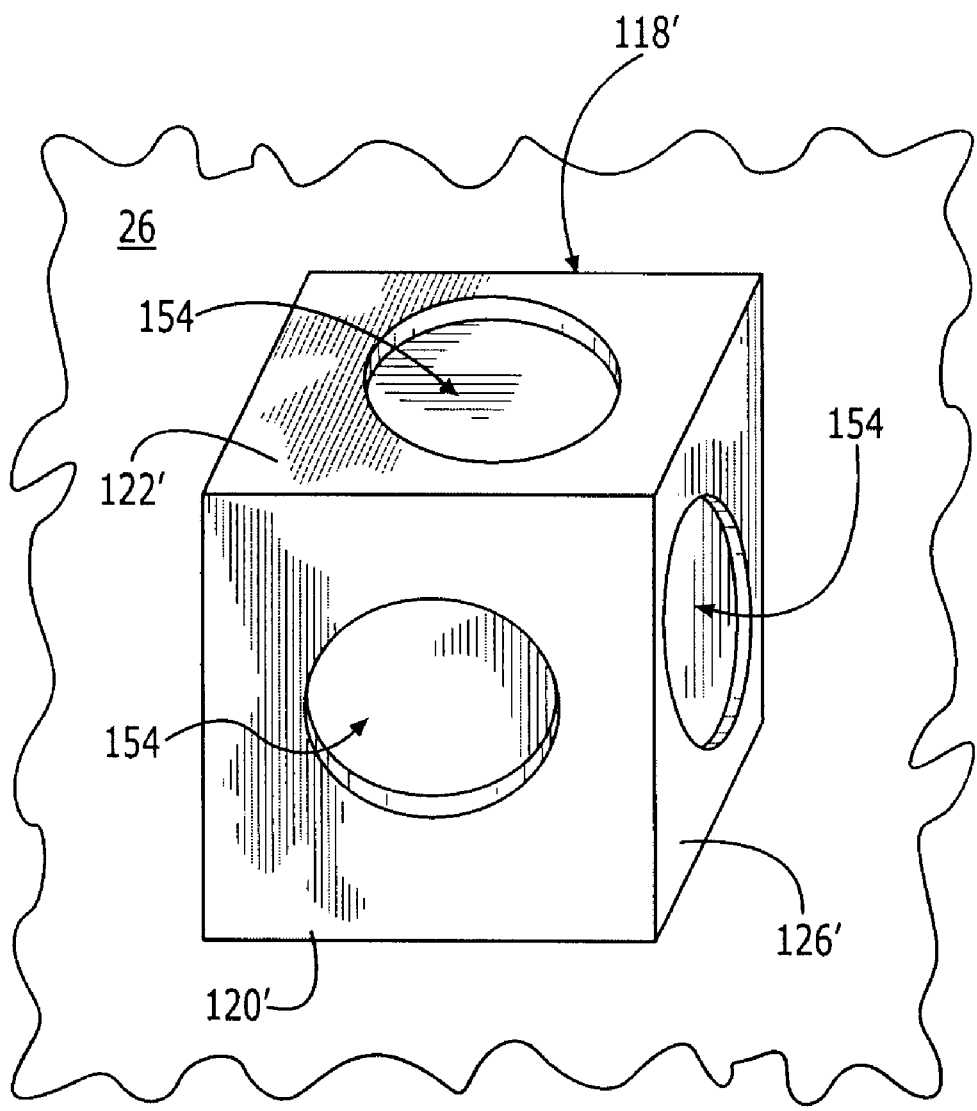
FIG. 18 is a partial view illustrating a cube target mounted to the upright wall of the bed of the manufacturing machine of FIG. 1, in accordance with a second embodiment of the present invention.

A second embodiment of the present invention is identical to the first embodiment, except for variations that are noted and variations that will be apparent to those of ordinary skill in the art. Referring to FIG. 18, in accordance with the second embodiment, cube targets 118' are used in place of the cube targets 118 (FIGS. 2 and 7) of the first embodiment, and the cube targets 118' of the second embodiment are constructed and arranged so that in accordance with the second embodiment the ring targets 112, 114 (FIGS. 2 and 6) of the first embodiment are not required.

Referring to FIG. 18, the representative cube target 118' can include multiple pocket-like annular ring targets that are respectively defined in and parallel to each of the accessible surfaces (i.e., the X-Y surface, the upper and lower X-Z surfaces, and the right and left Y-Z surfaces) of the cube target 1118'. For example, three separate pocket-like annular ring targets 154 are seen in FIG. 18, and they are respectively defined in the X-Y surface 120', the upper X-Z surface 122', and the right Y-Z surface 126'. In accordance with the second embodiment, the steps that were described as being carried out with respect to the ring targets 112, 114 (FIGS. 2 and 6) of the first embodiment are carried out with respect to each of the pocket-like annular ring targets 154. For example and in accordance with the second embodiment, ball-bar emulation is performed around the three pocket-like annular ring targets 154 illustrated in FIG. 18.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A machine that is capable of machining workpieces in at least a sequential fashion by moving a tool relative to the workpieces, the machine comprising:

a holder that is capable of respectively holding the workpieces;

a manipulator comprising a clamp that is operable for gripping the tool, wherein the manipulator is operative for moving the clamp relative to the holder so that the tool can be respectively used upon the workpieces;

a stimulus device mounted at a fixed position for remaining fixed relative to the holder while the machine machines the workpieces in the sequential fashion, wherein the stimulus device is a distinct component from the workpieces and is selected from a group consisting of:
a mechanical device comprising a mechanical stimulus located at a first reference position, wherein the first reference position is in fixed relation to the holder, and wherein the mechanical stimulus is a surface of the mechanical device, and
an optical transmitter operable for transmitting an optical stimulus so that the optical stimulus is located at a second reference position, wherein the second reference position is in fixed relation to the holder, and wherein the optical stimulus is a beam of coherent light which extends along a path, and the second reference position is in the path of the beam of coherent light;
a sensor assembly that is capable of being gripped by and carried by the clamp while the clamp is moved relative to the holder, wherein the sensor assembly comprises:
a sensor that is operative for generating a signal in response to being proximate a stimulus selected from the group consisting of the mechanical stimulus and the optical stimulus, and
a transmitter for transmitting the signal; and
a computer system comprising a receiver operative for receiving signals transmitted by the transmitter and a memory comprising a database, wherein the computer system is operable for causing the workpieces to be machined in a sequential fashion and for determining if the machine is not operating in a predetermined manner, comprising:
causing the clamp to hold the sensor assembly,
causing the manipulator to move the sensor assembly to proximate a reference position selected from the group consisting of the first and second reference positions while the stimulus device remains at the fixed position and the sensor assembly is held by the clamp so that the sensor generates a first signal in response to being stimulated solely by the stimulus device and the first signal is received by the receiver, whereby the sensor generates the first signal in response to being stimulated solely by the surface of the mechanical device or the beam of coherent light,
storing data representative of the first signal in the database,
causing the clamp to release the sensor assembly,
causing the clamp to hold the tool,
machining a first workpiece of the workpieces, including causing the manipulator to move the tool into contact with the first workpiece while the first workpiece is being held by the holder and the stimulus device remains at the fixed position,
causing the clamp to release the tool,
causing the clamp to hold the sensor assembly,
causing the manipulator to move the sensor assembly to proximate a reference position selected from the group consisting of the first and second reference positions while the stimulus device remains at the fixed position and the sensor assembly is held by the clamp so that the sensor generates a second signal in response to being stimulated solely by the stimulus device and the second signal is received by the receiver, whereby the sensor generates the second signal in response to being stimulated solely by the surface of the mechanical device or the beam of coherent light,
storing data representative of the second signal in the database,
causing the clamp to release the sensor assembly,
causing the clamp to hold the tool,
machining a second workpiece of the workpiece, including causing the manipulator to move the tool into contact with the second workpiece, while the second workpiece is being held by the holder and the stimulus device remains at the fixed position,
causing the clamp to release the tool, and
analyzing at least the first and second data in the database to determine if the machine is not operating in the predetermined manner and generating a signal if it is determined that the machine is not operating in the predetermined manner.

2. A machine according to claim 1, wherein:
the machine further comprises:
a bed, wherein the holder and the stimulus device are mounted to the bed, and the stimulus device is distant from the holder,
a tool rack defining:
a first receptacle that is capable of holding the tool while the clamp holds the sensor assembly, and
a second receptacle that is capable of holding the sensor assembly while the clamp holds the tool, and
a track, wherein the track is mounted to the bed; and
the manipulator comprises a carriage that is capable of traveling upon and along the track.

3. A machine according to claim 2, wherein the stimulus device comprises:
an optical transmitter mounted to the bed, wherein the optical transmitter is capable of transmitting at least one beam of coherent light along a path; and
an optical reflector positioned in the path and operable for reflecting at least the beam of coherent light.

4. A machine according to claim 1, wherein the sensor assembly comprises a plurality of sensors, and each of the sensors is operative for generating an electrical signal in response to the sensor assembly being proximate a stimulus selected from the group consisting of the mechanical stimulus and the optical stimulus.

5. A machine according to claim 4, wherein:
the stimulus device comprises the optical transmitter; and
each of the sensors comprises a device that is operative to provide an electrical signal in response to incident light.

6. A machine according to claim 4, wherein:
the stimulus device comprises the mechanical device, and
each of the sensors comprises a device that is operative to provide an electrical signal in response to mechanical stress.

7. A machine according to claim 6, wherein the mechanical device comprises a cube comprising planar surfaces that are the mechanical stimulus.

8. A machine according to claim 6, wherein the mechanical device comprises an annular part comprising a peripheral annular surface that is the mechanical stimulus.

9. A machine according to claim 1, further comprising a bed, wherein the holder and the stimulus device are mounted to the bed, and the stimulus device is distant from the holder.

* * * * *